US010754300B2

(12) United States Patent
Kato

(10) Patent No.: US 10,754,300 B2
(45) Date of Patent: Aug. 25, 2020

(54) TIMEPIECE AND CONTROL METHOD OF TIMEPIECE

(71) Applicant: Seiko Instruments Inc., Chiba-shi, Chiba (JP)

(72) Inventor: Kazuo Kato, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 332 days.

(21) Appl. No.: 15/784,307

(22) Filed: Oct. 16, 2017

(65) Prior Publication Data
US 2018/0107165 A1 Apr. 19, 2018

(30) Foreign Application Priority Data

Oct. 19, 2016 (JP) ................. 2016-205426
Jul. 26, 2017 (JP) ................. 2017-144295

(51) Int. Cl.
G04C 3/14 (2006.01)
G04B 33/08 (2006.01)
G04C 3/00 (2006.01)
G06F 1/3296 (2019.01)
G04F 7/08 (2006.01)
G04G 17/04 (2006.01)

(52) U.S. Cl.
CPC ............ G04C 3/146 (2013.01); G04B 33/08 (2013.01); G04C 3/008 (2013.01); G04C 3/143 (2013.01); G06F 1/3296 (2013.01); G04F 7/0871 (2013.01); G04G 17/04 (2013.01)

(58) Field of Classification Search
CPC .......... G04C 3/146; G04C 3/14; G04C 3/143; G04C 3/008; G04B 19/04; G04B 35/00; F06F 1/3296; G04F 7/0871; G04G 17/04
See application file for complete search history.

(56) References Cited

U.S. PATENT DOCUMENTS 4,666,311 A * 5/1987 Maire ................. G04F 8/00
368/155
5,933,392 A * 8/1999 Sato ................. G04C 3/146
318/685
6,912,181 B2 * 6/2005 Maruyama ......... G04C 17/0066
368/203
2010/0220559 A1 9/2010 Galie et al.

FOREIGN PATENT DOCUMENTS

JP 2012-516996 A 7/2012

* cited by examiner

Primary Examiner — Sean Kayes
(74) Attorney, Agent, or Firm — Brinks Gilson & Lione

(57) ABSTRACT

A timepiece, in which an indicating hand is driven by a motor and high speed processing is required for driving a load other than the indicating hand, includes a main control circuit that instructs drive timing of the motor so as to drive the load, and that is operated by an operation frequency serving as a first frequency, and a motor control unit that generates a drive pulse for driving the motor, and that is operated by an operation frequency serving as a second frequency which is lower than the first frequency.

13 Claims, 13 Drawing Sheets

TIMEPIECE AND CONTROL METHOD OF TIMEPIECE

RELATED APPLICATIONS

This application claims priority under 35 U.S.C. § 119 to Japanese Patent Application No. 2016-205426 filed on Oct. 19, 2016 and No. 2017-144295 filed on Jul. 26, 2017, the entire content of which are hereby incorporated by reference.

BACKGROUND OF THE INVENTION

1. Field of the Invention

The present invention relates to a timepiece and a control method of a timepiece.

2. Description of Related Art

In recent years, an analog electronic timepiece configured to include a motor drive circuit and a central processing unit (CPU) for controlling the motor drive circuit has been proposed. For example, JP-T-2012-516996 (Patent Reference 1) discloses a configuration in which a core CPU controls a motor indicating hand control circuit. In addition to the motor indicating hand control circuit, the core CPU also controls an input control circuit.

In addition, in recent years, a timepiece is known which transmits and receives information by communicating with a mobile terminal such as a smartphone or communicates with a satellite such as a global positioning system (GPS). In this way, in recent years, objects controlled by the CPU have increased alongside an increase in functions of the CPU.

However, in the related art, in a case where the timepiece is converted to an electronic terminal so as to communicate with a smartphone, a time required for processing increases and the number of objects to be processed increases, thereby resulting in a heavy load operation. In a case where the timepiece converted to the electronic terminal in this way needs high speed processing during the heavy load operation, current consumption tends to increase due to the high speed processing of the CPU. Consequently, in the related art, even if the CPU intends to operate hands as in the past, power consumption has increased due to other processing tasks of the CPU.

SUMMARY OF THE INVENTION

The present invention is made in view of the above-described problem, and an object thereof is to provide a timepiece and a control method of a timepiece, which enable an indicating hand to be driven with low power consumption even if the timepiece requires high speed processing.

In order to achieve the above-described object, a timepiece (electronic device 1, 1A, 1B) according to an aspect of the invention, in which an indicating hand (60) is driven by a motor (48) and high speed processing is required for driving a load other than the indicating hand, includes a main control circuit (204, 204B) that instructs drive timing of the motor so as to drive the load, and that is operated by an operation frequency serving as a first frequency, and a motor control unit (motor drive control unit 40, motor drive control unit 40B) that generates a drive pulse for driving the motor, and that is operated by an operation frequency serving as a second frequency which is lower than the first frequency.

For example, the load other than the indicating hand is a display drive circuit and a communication circuit. In addition, the first frequency is 100 MHz, for example. The second frequency is 32 kHz, for example.

In addition, in the timepiece according to the aspect of the present invention, a clock signal forming a basis of the first frequency and a clock signal forming a basis of the second frequency may be asynchronous with each other.

In addition, in the timepiece according to the aspect of the present invention, based on the first frequency, the main control circuit may output an instruction signal for instructing drive timing of the motor to the motor control unit. Based on the first frequency, the main control circuit may output a timing definition signal for defining timing that enables the instruction signal to be instructed to the motor control unit. The motor control unit may generate the drive pulse, based on the second frequency, at timing in response to the instruction signal.

For example, the timing definition signal is a GATE signal. In addition, the first level is an L-level or an H-level, for example. The second level is the H-level in a case where the first level is the L-level, and is the L-level in a case where the first level is H-level.

In addition, in the timepiece according to the aspect of the present invention, the instruction signal may include an instruction pulse. The motor control unit may include a determination circuit (normal/reverse rotation determination circuit 45, hand operation classification determination circuit 451) which counts the number of the received instruction pulses included in the instruction signal while receiving the timing definition signal, and which determines at least two types of hand operation classification for operating the indicating hand via the motor in response to the number of the instruction pulses. Based on a result determined by the determination circuit, the motor control unit may operate the indicating hand via the motor in response to the hand operation classification.

In addition, in the timepiece according to the aspect of the present invention, the instruction signal may be configured to include the instruction pulses, the number of which varies in response to the hand operation classification, during a period of the timing definition signal, each time that two or more types of operation are performed.

In addition, in the timepiece according to the aspect of the present invention, the main control circuit may change a level of the timing definition signal from a first level to a second level. After changing the timing definition signal to the second level, the main control circuit may change a level of the instruction signal from the first level to the second level. After changing the instruction signal to the second level, the main control circuit may change the instruction signal to the first level. After changing the instruction signal to the first level, the main control circuit may change the timing definition signal from the second level to the first level.

In addition, in the timepiece according to the aspect of the present invention, the hand operation classification may include at least one of a first type of causing the indicating hand to perform a first operation via the motor, a second type of causing the indicating hand to perform a second operation different from the first operation via the motor, a third type of causing the indicating hand to perform a third operation different from the first operation and the second operation via the motor, and a fourth type of causing the indicating hand to perform a fourth operation different from the first operation, the second operation, and the third operation via the motor.

In addition, in the timepiece according to the aspect of the present invention, the first type may be an operation for causing the indicating hand to perform normal rotation via the motor, and the number of the instruction signals is one while the timing definition signal is received. The second type may be an operation for causing the indicating hand to perform reverse rotation via the motor, and the number of the instruction signals is two while the timing definition signal is received. The third type may be an operation for causing the indicating hand to perform an operation via the motor so as to notify a user of a lowered battery voltage when a voltage value of a battery supplying power to the timepiece is small, and the number of the instruction signals is three while the timing definition signal is received. The fourth type may be an operation for causing the indicating hand to perform an operation different from that when the time is displayed via the motor, and the number of the instruction signals is four while the timing definition signal is received.

In addition, in the timepiece according to the aspect of the present invention, the motor may include a first motor for driving a first indicating hand, and a second motor for driving a second indicating hand. The main control circuit may change a level of the timing definition signal from a first level to a second level. After changing the timing definition signal to the second level, the main control circuit may change each level of a first instruction signal for instructing driving of the first motor and a second instruction signal for instructing driving of the second motor, from the first level to the second level. After changing the first instruction signal and the second instruction signal to the second level, the main control circuit may change each of the first instruction signal and the second instruction signal to the first level. After changing each of the first instruction signal and the second instruction signal to the first level, the main control circuit may change the timing definition signal from the second level to the first level.

In addition, in the timepiece according to the aspect of the present invention, the indicating hand may display the time.

In addition, in the timepiece according to the aspect of the present invention, the number of signal lines through which the instruction signal passes so as to instruct the motor for driving the indicating hand to generate the drive pulse may be the same as the number of the motors. The number of signals input to the motor control unit for controlling the motor including the instruction signal may be obtained by adding one to the number of the motors.

In order to achieve the above-described object, a control method of a timepiece according to an aspect of the invention, in which an indicating hand is driven by a motor and high speed processing is required for driving a load other than the indicating hand, includes a step which is operated by an operation frequency serving as a first frequency, and in which a main control circuit for driving the load instructs drive timing of the motor, and a step in which a motor control unit operated by an operation frequency serving as a second frequency which is lower than the first frequency generates a drive pulse for driving the motor. The step of instructing the drive timing includes a step of changing a level of a timing definition signal for defining the drive timing of the motor from a first level to a second level, based on timing of the first frequency, a step of changing a level of an instruction signal for instructing driving of the motor from the first level to the second level, after changing the timing definition signal to the second level, a step of changing the instruction signal to the first level, after changing the instruction signal to the second level, and a step of changing the timing definition signal from the second level to the first level, after changing the instruction signal to the first level.

In addition, the control method of a timepiece according to the aspect of the present invention may further include a step of causing the motor control unit to count the number of instruction pulses included in the instruction signal during a period while the timing definition signal is in the second level, and a step of causing the motor control unit to determine hand operation classification for operating the indicating hand via the motor in response to the number of the counted instruction pulses, and to generate a drive pulse for driving the motor in response to the determined hand operation classification.

According to the present invention, an indicating hand can be driven with low power consumption even if a timepiece requires high speed processing.

DETAILED DESCRIPTION OF THE PREFERRED EMBODIMENTS

Hereinafter, embodiments according to the present invention will be described with reference to the drawings. A timepiece according to the embodiments is an electronic device such as an analog timepiece, a smart watch, and a wearable terminal which have an indicating hand. Hereinafter, in the embodiments, an example will be described in which the timepiece is the electronic device such as the smart watch.

First Embodiment

Figure 1:
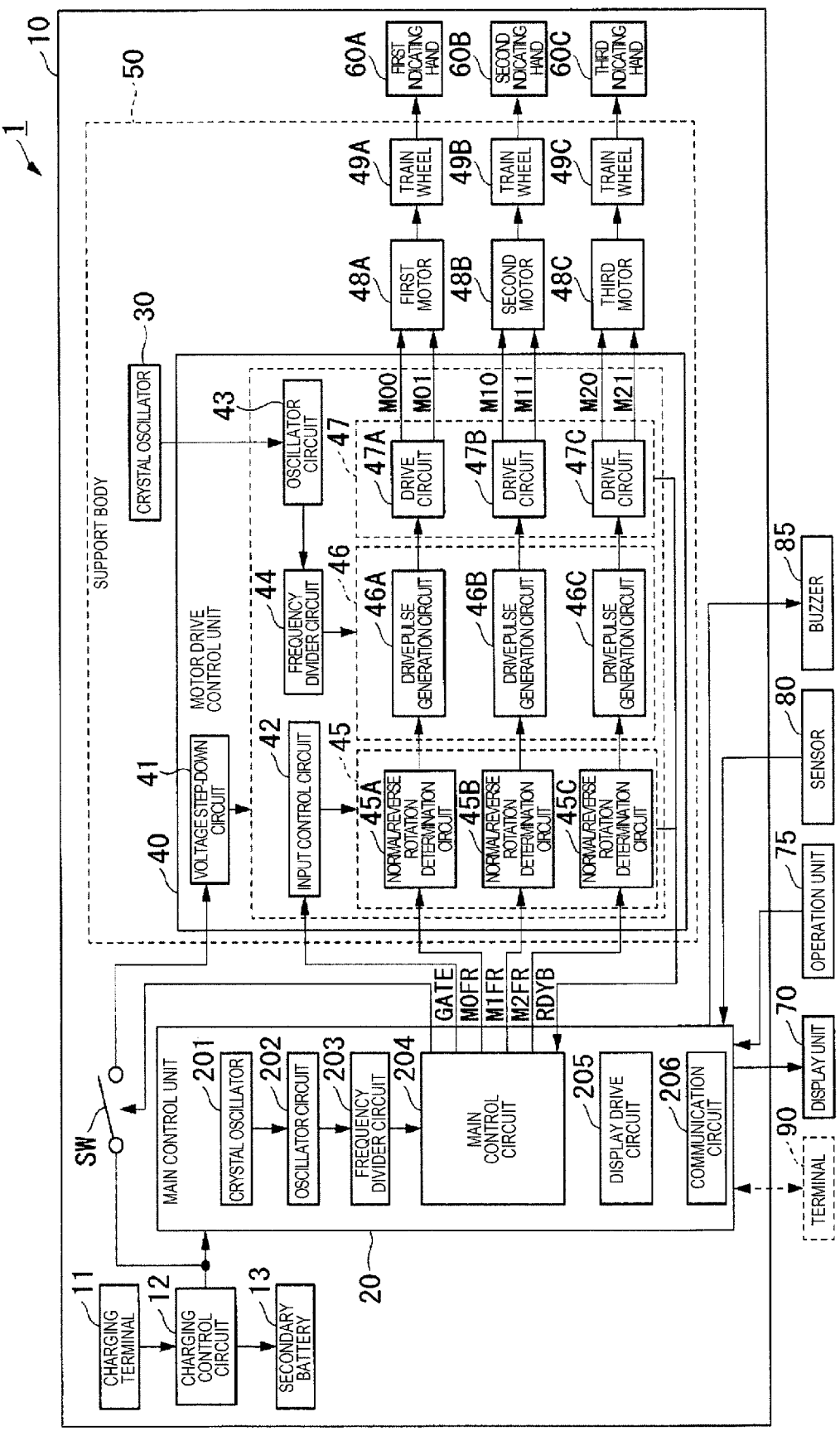
FIG. 1 is a block diagram illustrating a configuration example of an electronic device according to a first embodiment.

FIG. 1 is a block diagram illustrating a configuration example of an electronic device 1 according to a first embodiment.

As illustrated in FIG. 1, the electronic device 1 includes a charging terminal 11, a charging control circuit 12, a secondary battery 13, a switch SW, a main control unit 20, a support body 50, a first indicating hand 60A, a second indicating hand 60B, a third indicating hand 60C, a display unit 70, an operation unit 75, a sensor 80, and a buzzer 85. In a case where one of the first indicating hand 60A, the second indicating hand 60B, and the third indicating hand 60C is not specified, all of these are collectively referred to as an indicating hand 60.

The main control unit 20 includes a crystal oscillator 201, an oscillator circuit 202, a frequency divider circuit 203, a main control circuit 204, a display drive circuit 205, and a communication circuit 206. For example, a load other than the indicating hand is the display drive circuit 205 and the communication circuit 206.

A crystal oscillator 30, a motor drive control unit 40, a first motor 48A, a second motor 48B, a third motor 48C, a train wheel 49A, a train wheel 49B, and a train wheel 49C are attached to the support body 50. In a case where one of the first motor 48A, the second motor 48B, and the third motor 48C is not specified, all of these are collectively referred to as a motor 48. In addition, in a case where one of the train wheel 49A, the train wheel 49B, and the train wheel 49C is not specified, all of these are collectively referred to as a train wheel 49. The support body 50 is detachably attached to the electronic device 1, and is handled as a semi-finished product or an intermediate product in a case where the electronic device 1 is a finished product. However, the configuration is not limited thereto.

The motor drive control unit 40 includes a voltage stepdown circuit 41, an input control circuit 42, an oscillator circuit 43, a frequency divider circuit 44, a normal/reverse rotation determination circuit 45 (determination circuit), a drive pulse generation circuit 46, and a drive circuit 47. In addition, the normal/reverse rotation determination circuit 45 includes a normal/reverse rotation determination circuit 45A (determination circuit), a normal/reverse rotation determination circuit 45B (determination circuit), and a normal/reverse rotation determination circuit 45C (determination circuit). The drive pulse generation circuit 46 includes a drive pulse generation circuit 46A, a drive pulse generation circuit 46B, and a drive pulse generation circuit 46C. The drive circuit 47 includes a drive circuit 47A, a drive circuit 47B, and a drive circuit 47C.

In the embodiment, a combination of the normal/reverse rotation determination circuit 45A, the drive pulse generation circuit 46A, and the drive circuit 47A, a combination of the normal/reverse rotation determination circuit 45B, the drive pulse generation circuit 46B, and the drive circuit 47B, and a combination of the normal/reverse rotation determination circuit 45C, the drive pulse generation circuit 46C, and the drive circuit 47C are respectively referred to as a motor control unit. The first motor control unit is one of the combination of the normal/reverse rotation determination circuit 45A, the drive pulse generation circuit 46A, and the drive circuit 47A, the combination of the normal/reverse rotation determination circuit 45B, the drive pulse generation circuit 46B, and the drive circuit 47B, and the combination of the normal/reverse rotation determination circuit 45C, the drive pulse generation circuit 46C, and the drive circuit 47C. In addition, the second motor control unit is a combination of a normal/reverse rotation determination circuit 45$n$ (n is one of A, B, and C), a drive pulse generation circuit 46$n$, and a drive circuit 47$n$ other than the first motor control unit. In addition, the third motor control unit is a combination of the normal/reverse rotation determination circuit 45$n$ (n is one of A, B, and C), the drive pulse generation circuit 46$n$, and the drive circuit 47$n$ other than the first motor control unit and the second motor control unit.

The electronic device 1 presents the time by using the first indicating hand 60A to the third indicating hand 60C during a clocking operation. The electronic device 1 communicates with a terminal 90 via a wired or wireless network so as to transmit and receive information. For example, the electronic device 1 transmits a detection value detected by the sensor 80 and residual quantity information indicating a residual quantity of the secondary battery 13 to the terminal 90 via the network. For example, the electronic device 1 receives time information from the terminal 90, and corrects the counted time in accordance with the received time information. In addition, the electronic device 1 receives an operation instruction from the terminal 90, and controls driving of the first indicating hand 60A to the third indicating hand 60C in accordance with the received operation instruction.

The terminal 90 is a device having a communication function, for example, a smartphone, a tablet terminal, a portable game machine, and a computer. For example, the terminal 90 is configured to include an operation unit, a display unit, a control unit, a global positioning system (GPS), a communication unit, and a battery. The terminal 90 transmits time information acquired using the GPS, an operation instruction, residual quantity information of the battery of the terminal itself to the electronic device 1 via the network. In addition, the terminal 90 receives the detection value transmitted by the electronic device 1, and the residual quantity information via the network, and displays the received information on the display unit.

A circuit board 10 (substrate) (base) is a base to which the main control unit 20 and the support body 50 are attached. The charging terminal 11, the charging control circuit 12, the secondary battery 13, the main control unit 20, and the support body 50 are attached to the circuit board 10.

The charging terminal 11 receives power supply from the outside, and is a universal serial bus (USB) terminal. The charging terminal 11 supplies the supplied power to the charging control circuit 12.

The charging control circuit 12 charges the secondary battery 13 with the power supplied from the charging terminal 11. The charging control circuit 12 supplies the power stored in the secondary battery 13 to the main control unit 20 and the motor drive control unit 40 attached to the support body 50.

The secondary battery 13 is a lithium ion polymer battery, for example.

The main control unit 20 controls each configuration element included in the electronic device 1. The main control unit 20 causes the display unit 70 to display information. The information to be displayed is the residual quantity of the secondary battery 13, for example. In addition, the main control unit 20 acquires an operation result obtained by a user operating the operation unit 75, and controls each configuration element included in the electronic device 1 in accordance with the acquired operation result. In addition, the main control unit 20 acquires the detection value output by the sensor 80.

The crystal oscillator 201 is a passive element used for causing a first frequency to oscillate from mechanical resonance by utilizing a piezoelectric phenomenon of quartz. Herein, the first frequency is 100 [MHz], for example.

The oscillator circuit 202 realizes an oscillator in combination with the crystal oscillator 201, and outputs a signal of the generated first frequency to the frequency divider circuit 203.

The frequency divider circuit 203 divides the signal of the first frequency output by the oscillator circuit 202 into a desired frequency, and outputs the divided signal to the main control circuit 204.

The main control circuit 204 is operated at timing of a signal output by a drive frequency, based on the first frequency. The main control circuit 204 is a central processing unit (CPU) for a mobile terminal or a wearable terminal, for example, and is a CPU using ARM architecture. In addition, the main control circuit 204 internally includes a storage unit, and stores a correspondence relationship between the instruction signal and the motor 48 (to be described later) and the definition of the instruction signal (normal rotation instruction using one instruction pulse, or the reverse rotation instruction using two instruction pulses). The main control circuit 204 may separately include the storage unit. In the present embodiment, an instruction for causing the indicating hand 60 to perform normal rotation one step via the motor 48 is referred to as a first type hand operation, and an instruction for causing the indicating hand 60 to perform reverse rotation one step via the motor 48 is referred to as a second type hand operation.

The main control circuit 204 outputs the instruction signal for driving the motor 48 to the motor drive control unit 40 at the timing of the signal output by the frequency divider circuit 203. The main control circuit 204 and the motor drive control unit 40 are connected to each other by two control lines (GATE and RDYB) and three signal lines (M0FR, M1FR, and M2FR).

The main control circuit 204 controls each configuration element of the electronic device 1, based on an operation result output by the operation unit 75. For example, the operation result is a time adjustment operation or an alarm operation. In a case of the time adjustment operation, for example, the main control circuit 204 causes the third indicating hand 60C to move to a 12 o'clock position, and stops the third indicating hand 60C. Furthermore, the main control circuit 204 controls the first indicating hand 60A and the second indicating hand 60B to perform a fast forwarding operation or to perform fast rewinding operation. At the time of the alarm operation, the main control circuit 204 counts signals output by the frequency divider circuit 203, and issues a signal from the buzzer 85 when the set time is up, or when the set time elapses.

The main control circuit 204 controls a state of power supply to the motor drive control unit 40 by switching between an on-state and an off-state of the switch SW. For example, in a case where the residual quantity of the secondary battery 13 is smaller than a predetermined capacity, the main control circuit 204 may perform control so as to reduce intervals for power supply to the motor drive control unit 40 or to stop the power supply. Alternatively, the main control circuit 204 may perform control so as to reduce the intervals for power supply to the motor drive control unit 40 or to stop the power supply, based on the operation instruction received by the communication circuit 206. The switch SW may be configured to include a MOS transistor.

In addition, the main control circuit 204 controls an operation mode of the electronic device 1, based on the operation result output by the operation unit 75 or the operation instruction received by the communication circuit 206. Herein, the operation mode includes a clocking mode (normal operation mode), a chronograph mode, a time adjustment mode, an alarm setting mode, an alarm operation mode, and external control mode. In the external control mode, at least one of the first motor 48A to the third motor 48C is driven in response to the operation instruction output from the terminal 90 so as to operate the corresponding indicating hand. As an example, in a case where the terminal 90 transmits the battery residual quantity of the terminal 90 as the operation instruction, the main control circuit 204 may set 0% for the 12 o'clock position, 10% for the 1 o'clock position, . . . , and 100% for the 10 o'clock position, and may control the third indicating hand to present the battery residual quantity of the terminal 90.

Furthermore, the main control circuit 204 may detect the residual quantity of the secondary battery 13. The main control circuit 204 may cause the display drive circuit 205 to display the detected residual quantity information of the secondary battery 13 on the display unit 70. The main control circuit 204 may transmit the detected residual quantity information of the secondary battery 13 to the terminal 90 via the communication circuit 206 and the network.

The display drive circuit 205 causes the display unit 70 to display the display information output by the main control circuit 204. The display drive circuit 205 may be included in the display unit 70.

The communication circuit 206 transmits and receives information to and from the terminal 90 via the network in accordance with the control of the main control circuit 204. For example, the communication circuit 206 employs a communication method using the Wireless Fidelity (Wi-Fi) standard or the Bluetooth (registered trademark) Low Energy (hereinafter referred to as BLE) standard so as to transmit and receive the instruction or the information to and from the terminal 90. In addition, the communication circuit 206 may acquire the information from the GPS.

The crystal oscillator 30 is a passive element used for causing a second frequency to oscillate. Here, the second frequency is lower than the first frequency, and is 32 [kHz], for example.

The motor drive control unit 40 is operated at the timing of a signal based on the second frequency. For example, the motor drive control unit 40 is a motor driver IC (integrated circuit). The motor drive control unit 40 determines whether a control signal output by the main control circuit 204 is a control signal for causing the motor 48 to perform normal rotation or a control signal for causing the motor 48 to perform reverse rotation. Based on the determined result, the motor drive control unit 40 generates a drive pulse, and drives the motor 48 by outputting the generated drive pulse. In the present embodiment, an operation for causing the indicating hand 60 to perform normal rotation one step via the motor 48 is referred to as a first operation, and an operation for causing the indicating hand 60 to perform reverse rotation one step via the motor 48 is referred to as a second operation.

The voltage step-down circuit 41 steps down a voltage supplied from the charging control circuit 12 to 1.57 V, for example, and supplies the step-down voltage to each configuration element of the motor drive control unit 40.

A GATE signal is input to the input control circuit 42. The input control circuit 42 outputs a signal indicating a period while the GATE signal is in an H (High) level to the normal/reverse rotation determination circuit 45.

The oscillator circuit 43 realizes an oscillator in combination with the crystal oscillator 30, and outputs a signal of the generated second frequency to the frequency divider circuit 44.

The frequency divider circuit 44 divides a signal of the second frequency output by the oscillator circuit 43 into a desired frequency, and outputs the divided signal to the drive pulse generation circuit 46.

An M0FR signal serving as a first instruction signal is input to the normal/reverse rotation determination circuit 45A. The normal/reverse rotation determination circuit 45A counts the number of periods while the input control circuit 42 outputs a signal indicating the H-level and the number of periods while the M0FR signal is in the H-level. In this manner, the normal/reverse rotation determination circuit 45A determines whether the M0FR signal is a normal rotation instruction signal or a reverse rotation instruction signal. The normal/reverse rotation determination circuit 45A determines that a signal equal to or greater than a threshold value is in the H-level. When the GATE signal is changed from the H-level to the L (low) level, the normal/reverse rotation determination circuit 45A outputs the determination result to the drive pulse generation circuit 46A. The determination result is information indicating either the normal rotation or the reverse rotation, or a signal indicating either the normal rotation or the reverse rotation. In the present embodiment, the H-level is set as a first level, and the L-level is set as a second level.

An M1FR signal serving as a second instruction signal is input to the normal/reverse rotation determination circuit 45B. The normal/reverse rotation determination circuit 45B counts the number of periods while the input control circuit 42 outputs a signal indicating the H-level and the number of periods while the M1FR is in the H-level. In this manner, the normal/reverse rotation determination circuit 45B determines whether the M1FR signal is the normal rotation instruction signal or the reverse rotation instruction signal. When the GATE signal is changed from the H-level to the L-level, the normal/reverse rotation determination circuit 45B outputs the determination result to the drive pulse generation circuit 46B.

An M2FR signal serving as a third instruction signal is input to the normal/reverse rotation determination circuit 45C. The normal/reverse rotation determination circuit 45C counts the number of periods while the input control circuit 42 outputs the signal indicating the H-level and the number of periods while the M2FR is in the H-level. In this manner, the normal/reverse rotation determination circuit 45C determines whether the M2FR signal is the normal rotation instruction signal or the reverse rotation instruction signal. When the GATE signal is changed from the H-level to the L-level, the normal/reverse rotation determination circuit 45C outputs the determination result to the drive pulse generation circuit 46C.

Based on the determination result output by the normal/reverse rotation determination circuit 45A, the drive pulse generation circuit 46A generates a pulse signal for causing the first motor 48A to perform normal rotation one step or reverse rotation one step, and outputs the generated pulse signal to the drive circuit 47A.

Based on the determination result output by the normal/reverse rotation determination circuit 45B, the drive pulse generation circuit 46B generates a pulse signal for causing the second motor 48B to perform normal rotation one step or reverse rotation one step, and outputs the generated pulse signal to the drive circuit 47B.

Based on the determination result output by the normal/reverse rotation determination circuit 45C, the drive pulse generation circuit 46C generates a pulse signal for causing the third motor 48C to perform normal rotation one step or reverse rotation one step, and outputs the generated pulse signal to the drive circuit 47C.

Based on the pulse signal output by the drive pulse generation circuit 46A, the drive circuit 47A generates drive signals M00 and M01 for driving the first motor 48A, and the first motor 48A is driven by the generated drive signals M00 and M01.

Based on the pulse signal output by the drive pulse generation circuit 46B, the drive circuit 47B generates drive signals M10 and M11 for driving the second motor 48B, and the second motor 48B is driven by the generated drive signals M10 and M11.

Based on the pulse signal output by the drive pulse generation circuit 46C, the drive circuit 47C generates drive signals M20 and M21 for driving the third motor 48C, and the third motor 48C is driven by the generated drive signals M20 and M21.

Each of the first motor 48A, the second motor 48B, and the third motor 48C is a stepping motor.

The first motor 48A drives the first indicating hand 60A via the train wheel 49A in response to the drive signals M00 and M01 output by the drive circuit 47A. The second motor 48B drives the second indicating hand 60B via the train wheel 49B in response to the drive signals M10 and M11 output by the drive circuit 47B. The third motor 48C drives the third indicating hand 60C via the train wheel 49C in response to the drive signals M20 and M21 output by the drive circuit 47C.

Each of the train wheels 49A, 49B, and 49C is configured to include at least one gear.

For example, the first indicating hand 60A is an hour hand, and is rotatably supported by the support body 50. For example, the second indicating hand 60B is a minute hand, and is rotatably supported by the support body 50. For example, the third indicating hand 60C is a second hand, and is rotatably supported by the support body 50.

As an example, the display unit 70 is a liquid crystal display (LCD). For example, the display unit 70 displays the residual quantity information of the secondary battery 13 under the control of the main control circuit 204. For example, the display unit 70 may display an operation mode of the electronic device 1 under the control of the main control circuit 204.

The operation unit 75 is configured to include at least one button or crown. The operation unit 75 detects an operation result operated by a user, and outputs the detected operation result to the main control circuit 204. The operation unit 75 may be a touch panel sensor disposed in the display unit 70 or glass on the dial. In addition, the operation unit 75 may detect that the buzzer 85 is tapped, and may use the detection result as an operation result. A signal applied to the buzzer 85, which is a piezoelectric element, is detected using the method of the invention disclosed in JP-A2014-139542, for example.

The sensor 80 is at least one of an acceleration sensor, a geomagnetic sensor, an atmospheric pressure sensor, a temperature sensor, and an angular velocity sensor. The sensor 80 outputs the detection value to the main control circuit 204. The main control circuit 204 uses a detection value of the acceleration sensor so as to detect the inclination of the electronic device 1. For example, the acceleration sensor is a three-axis sensor, which detects gravitational acceleration. The main control circuit 204 uses a detection value of the geomagnetic sensor so as to detect a direction of the electronic device 1. The main control circuit 204 uses a detection value of atmospheric pressure sensor for a barometer or an altimeter. The main control circuit 204 uses a detection value of the angular velocity sensor (gyro sensor) so as to detect the rotation of the electronic device 1.

The buzzer 85 is a piezoelectric element, which issues an alarm in accordance with the control of the main control circuit 204.

For example, the first frequency serving as the operation frequency of the above-described main control circuit 204 is 100 MHz, and is used for driving the load through high speed processing. For example, the second frequency serving as the operation frequency of the motor drive control unit 40 is 32 kHz. In addition, for example, in the drive frequency of the main control circuit 204, 7.5 ms interval drive of BLE is 133 Hz. For example, the drive frequency of the motor drive control unit 40 is 32 Hz for fast forwarding drive of the indicating hand, and second hand operation drive is 1 Hz. In this way, the operation frequency represents the operation frequency (clock frequency) supplied from the frequency divider circuit 203 to the main control circuit 204, and the operation frequency (clock frequency) supplied from the crystal oscillator 30 to the motor drive control unit 40. The operation frequency is different from a drive frequency (frequency for driving) which drives the motor serving as a driven unit. In addition, the clock signal forming a basis of the first frequency generated by the oscillation of the oscillator circuit 202 and the clock signal forming a basis of the second frequency generated by oscillation of the oscillator circuit 43 are asynchronous with each other.

<Description of Control Line and Signal Line>

Herein, the control line and the signal line will be described.

The two control lines are GATE and RDYB, and the three signal lines are M0FR, M1FR, and M2FR. The control line GATE is the control line through which the main control circuit 204 outputs the GATE signal, and the GATE signal indicates a boundary of timing to output the instruction signals (M0FR, M1FR, and M2FR) to each motor 48. In other words, the GATE signal is a timing definition signal which defines (defines, or demarcates, or delimits) the drive timing of each the motor 48 by distinguishing the drive timing of each motor 48 from other timing. The signal line M0FR is the signal line through which the main control circuit 204 outputs the M0FR signal serving as the first instruction signal, and is the instruction signal which causes the first motor 48A to perform normal rotation or reverse rotation. The signal line M1FR is the signal line through which the main control circuit 204 outputs the M1FR signal serving as the second instruction signal, and is the instruction signal which causes the second motor 48B to perform normal rotation or reverse rotation. The signal line M2FR is the signal line through which the main control circuit 204 outputs the M2FR signal serving as the third instruction signal and is the instruction signal which causes the third motor 48C to perform normal rotation or reverse rotation. The control line RDYB is the control line through which the motor drive control unit 40 outputs the RDYB signal, and is a signal indicating a period during which the motor drive control unit 40 performs the instruction.

In the example illustrated in FIG. 1, an example of three indicating hands and three motors 48 has been described. However, the configuration of the electronic device 1 is not limited thereto. For example, in a case of two indicating hand and two motors, the motor drive control unit 40 may include the normal/reverse rotation determination circuits 45A and 45B, the drive pulse generation circuits 46A and 46B, and the drive circuits 47A and 47B. In this case, the main control circuit 204 and the motor drive control unit 40 may be connected to each other by two control lines (GATE and RDYB) and two signal lines (M0FR and M1FR). In addition, in a case of one indicating hand and one motor 48, the motor drive control unit 40 may include the normal/reverse rotation determination circuit 45A, the drive pulse generation circuit 46A, and the drive circuit 47A. In this case, the main control circuit 204 and the motor drive control unit 40 may be connected to each other by two control lines (GATE and RDYB) and one signal line (M0FR).

<Description of Arrangement on Circuit Board 10>

Next, an example will be described in which the charging terminal 11, the charging control circuit 12, the secondary battery 13, the main control unit 20, and the support body 50 are arranged on the circuit board 10. The arrangement example illustrated in FIG. 2 is merely an example, and the arrangement on the circuit board 10 in the electronic device 1 is not limited thereto.

Figure 2:
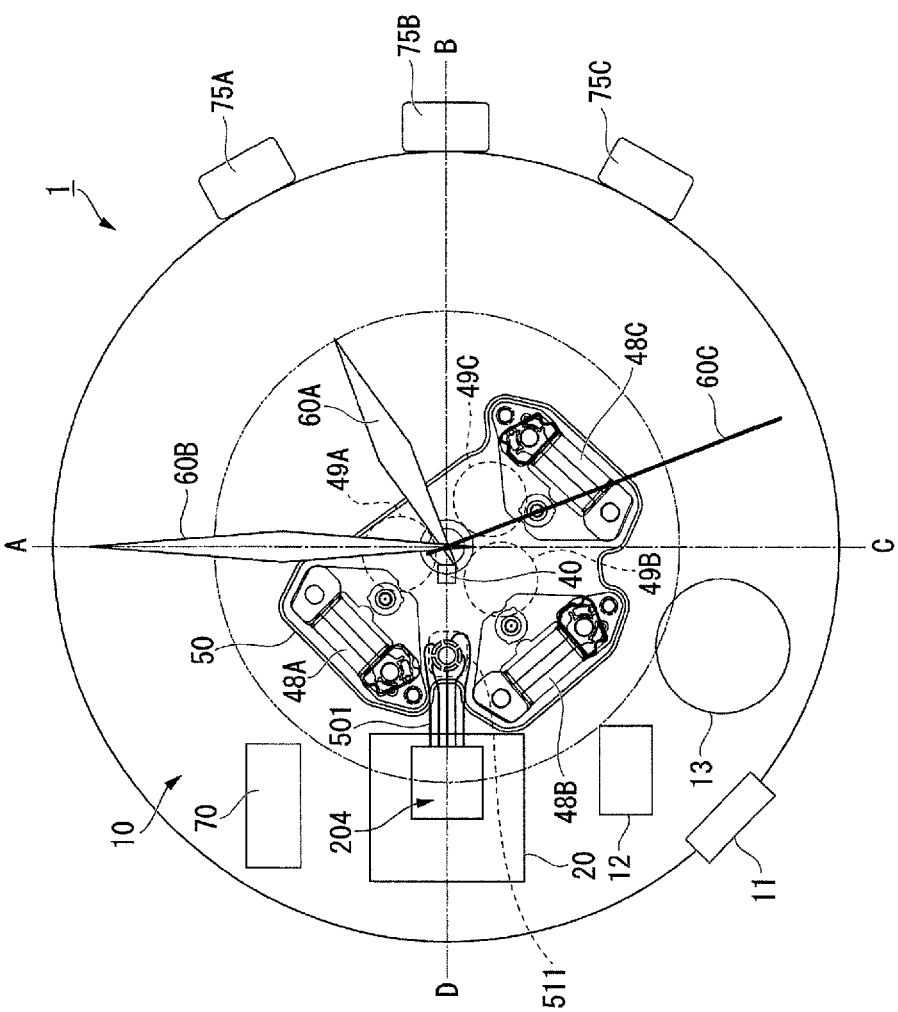
FIG. 2 is a view illustrating an example in which a charging terminal, a charging control circuit, a secondary battery, a main control unit, and a support body are arranged on a substrate according to the first embodiment.

FIG. 2 is a view illustrating an example in which the charging terminal 11, the charging control circuit 12, the secondary battery 13, the main control unit 20, and the support body 50 are arranged on the circuit board 10 according to the present embodiment. In FIG. 2, a position A to a position D around the timepiece centered on a line AB are respectively referred to as a 12 o'clock position, a 3 o'clock position, a 6 o'clock position, and a 9 o'clock position. As illustrated in FIG. 2, on the circuit board 10, the support body 50 is disposed substantially at the center, the main control unit 20 is disposed approximately at the 9 o'clock position, and the display unit 70 is disposed approximately at the 11 o'clock position. The main control circuit 204 and the motor drive control unit 40 are connected to each other by two control lines (GATE and RDYB) and three signal lines (M0FR, M1FR, and M2FR) as indicated by the reference numeral 501. In the example illustrated in FIG. 2, the support body 50 includes a connector 511, and the main control circuit 204 and five signal lines are connected to the connector 511. In this case, the connector 511 and the motor drive control unit 40 are connected to each other by a wiring material disposed on the support body 50.

In addition, operation units 75A to 75C are arranged approximately at the 2 o'clock to 4 o'clock positions on the right side of the circuit board 10. The secondary battery 13 is disposed approximately at the 7 o'clock position on the lower left side of the circuit board 10. The charging control circuit 12 and the charging terminal 11 are arranged approximately at the 8 o'clock position.

In addition, the motor drive control unit 40, the first motor 48A, the second motor 48B, the third motor 48C, the train wheel 49A, the train wheel 49B, and the train wheel 49C are attached onto the support body 50. Furthermore, the first indicating hand 60A, the second indicating hand 60B, and the third indicating hand 60C are attached to the support body 50.

In the example illustrated in FIGS. 1 and 2, an example has been described in which three sets of motor control unit (the normal/reverse rotation determination circuit, the drive pulse generation circuit, and the drive circuit) and three motors 48 are arranged on the support body 50. However, the configuration is not limited thereto.

For example, the first support body 50 may include the crystal oscillator 30, the voltage step-down circuit 41, the input control circuit 42, the oscillator circuit 43, the frequency divider circuit 44, two sets of motor control unit (the normal/reverse rotation determination circuits 45A and 45B, the drive pulse generation circuits 46A and 46B, and the drive circuits 47A and 47B). The second support body 50 may include the crystal oscillator 30, the voltage step-down circuit 41, the input control circuit 42, the oscillator circuit 43, the frequency divider circuit 44, one set of motor control unit (the normal/reverse rotation determination circuit 45C, the drive pulse generation circuit 46C, and the drive circuit 47C). In this case, the main control circuit 204 and the first support body may be connected to each other by two control lines (GATE and RDYB) and two signal lines (M0FR and M1FR). The main control circuit 204 and the second support body may be connected to each other by two control lines (GATE and RDYB) and one signal line (M2FR). Even in this case, the total number of the control lines and the signal lines between the main control circuit 204 and the support body 50 is five. According to this configuration, the indicating hand is more freely disposed on the dial (not illustrated).

<Description of Example of Timing of Each Signal>

Next, an example of timing of the GATE signal, the instruction signals (M0FR, M1FR, and M2FR), the drive pulse, and the RDYB signal will be described.

Figure 3:
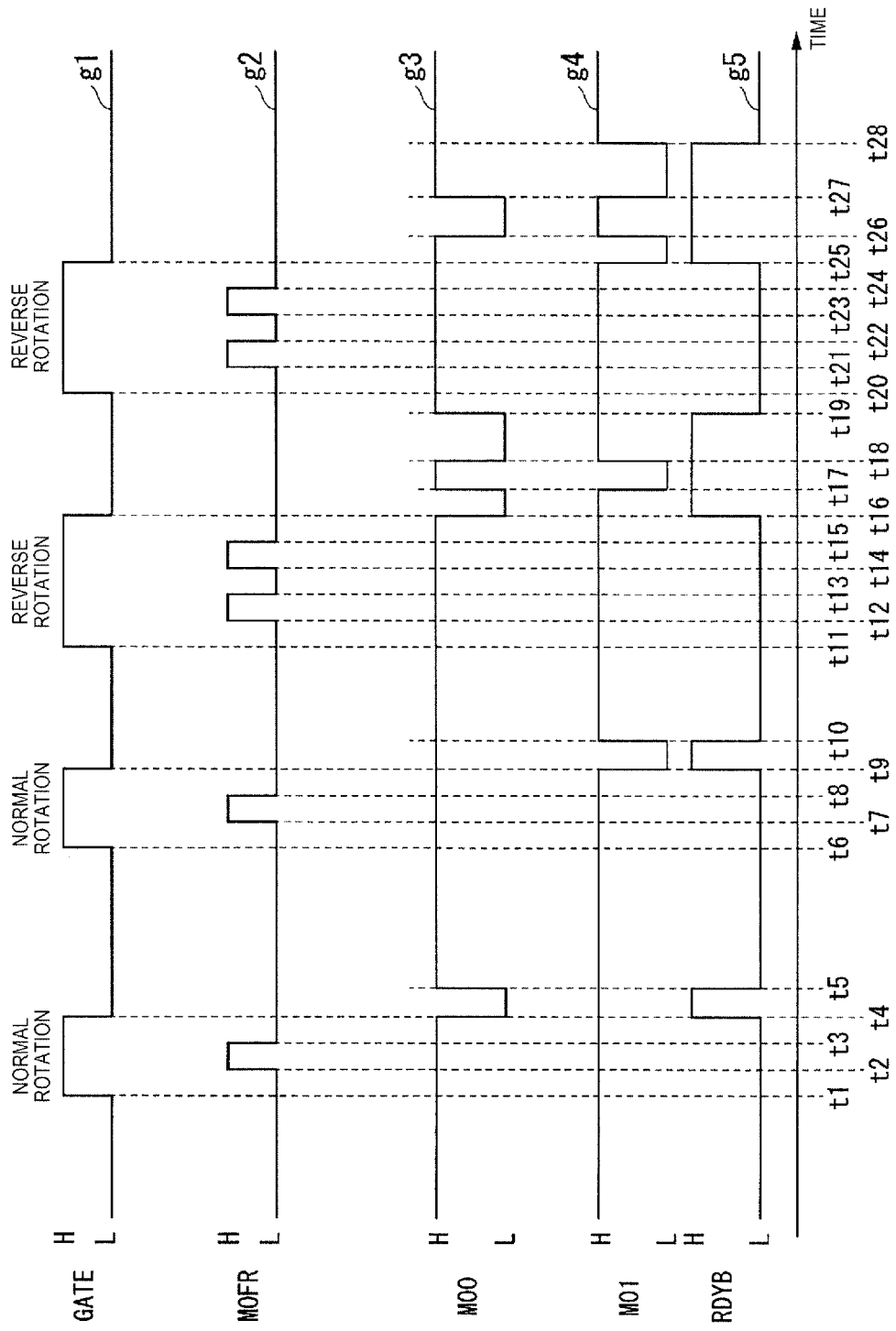
FIG. 3 is a view illustrating an example of timing of a GATE signal, an instruction signal (M0FR), a drive pulse, and an RDYB signal according to the first embodiment.

FIG. 3 is a view illustrating an example of the timing of the GATE signal, the instruction signal (M0FR), the drive pulse, and the RDYB signal according to the present embodiment. In FIG. 3, the horizontal axis represents the time, and the vertical axis represents whether each signal is in an H-level or in an L-level. In addition, a waveform g1 is a signal waveform of the GATE signal, a waveform g2 is a signal waveform of the M0FR signal, a waveform g3 is the signal waveform of the drive signal M00, a waveform g4 is a signal waveform of the drive signal M01, and a waveform g5 is a signal waveform of the RDYB signal. In addition, a period of times t1 to t10 is an example in which the motor 48 is caused to perform normal rotation, and a period of times t11 to t28 is an example in which the motor 48 is caused to perform reverse rotation.

The main control circuit 204 changes the GATE signal from the L-level to the H-level at time t1. Subsequently, the main control circuit 204 changes the M0FR signal from the L-level to the H-level at time t2, and changes the M0FR signal from the H-level to the L-level at time t3. A period (times t2 to t3) during which the M0FR signal is in the H-level is 10 [ns], for example. Subsequently, the main control circuit 204 changes the GATE signal from the H-level to the L-level at time t4. A period (times t1 to t4) during which the GATE signal is in the H-level is 30 [ns], for example.

Since in a period during which the GATE signal is in the H-level, the number of periods during which the M0FR signal is in the H-level is one (one instruction pulse), the normal/reverse rotation determination circuit 45A determines that the signal indicates the instruction for normal rotation of the motor 48. Subsequently, the drive circuit 47A changes the drive signal M00 from the H-level to the L-level at time t4, and changes the drive signal M00 from the L-level to the H-level at time t5. Based on the output of the normal/reverse rotation determination circuit 45A and the drive circuit 47A, the motor drive control unit 40 sets the RDYB signal to be in the H-level in a period of times t4 to t5. The period of times t4 to t5 during which the drive signal M00 is in the L-level is 5 to 6 [ms], for example.

The main control circuit 204 controls the GATE signal and the M0FR signal, similarly to the period of times t6 to t9 and the period of times t1 to t4.

Since in the period during which the GATE signal is in the H-level, the number of periods during which the M0FR signal is in the H-level is one, the normal/reverse rotation determination circuit 45A determines that the signal indicates the instruction for normal rotation of the motor 48. Subsequently, the drive circuit 47A changes the drive signal M01 from the H-level to the L-level at time t9, and changes the drive signal M01 from the L-level to the H-level at time t10. Based on the output of the normal/reverse rotation determination circuit 45A and the drive circuit 47A, the motor drive control unit 40 sets the RDYB signal to be in the H-level in a period of times t9 to t10. The period of times t9 to t10 during which the drive signal M01 is in the L-level is 5 to 6 [ms], for example.

The main control circuit 204 changes the GATE signal from the L-level to the H-level at time t11. Subsequently, the main control circuit 204 changes the M0FR signal from the L-level to the H-level at time t12, changes the M0FR signal from the H-level to the L-level at time t13, changes the M0FR signal from the L-level to the H-level at time t14, and changes the M0FR signal from the H-level to the L-level at time t15. Subsequently, the main control circuit 204 changes the GATE signal from the H-level to the L-level at time t16. A period (times t11 to t16) during which the GATE signal is in the H-level is 50 [ns], for example.

Since in the period during which the GATE signal is in the H-level, the number of periods during which the M0FR signal is in the H-level is two (two instruction pulses), the normal/reverse rotation determination circuit 45A determines that the signal indicates the instruction for reverse rotation of the motor 48. Subsequently, the drive circuit 47A changes the drive signal M00 from the H-level to the L-level at time t16. Subsequently, the drive circuit 47A changes the drive signal M00 from the L-level to the H-level at time t17, and changes the drive signal M01 from the H-level to the L-level. Subsequently, the drive circuit 47A changes the drive signal M00 from the H-level to the L-level at time t18, and changes the drive signal M01 from the L-level to the H-level. Subsequently, the drive circuit 47A changes the drive signal M00 from the L-level to the H-level at time t19. Based on the output of the normal/reverse rotation determination circuit 45A and the drive circuit 47A, the motor drive control unit 40 sets the RDYB signal to be in the H-level in a period of times t16 to t19.

The main control circuit 204 controls the GATE signal and the M0FR signal, similarly to the period of times t20 to t25 and the period of times t11 to t16.

Since in the period during which the GATE signal is in the H-level, the number of periods during which the M0FR signal is in the H-level is two, the normal/reverse rotation determination circuit 45A determines that the signal indicates the instruction for reverse rotation of the motor 48. Subsequently, the drive circuit 47A changes the drive signal M01 from the H-level to the L-level at time t25. Subsequently, the drive circuit 47A changes the drive signal M00 from the H-level to the L-level at time t26, and changes the drive signal M01 from the L-level to the H-level. Subsequently, the drive circuit 47A changes the drive signal M00 from the L-level to the H-level at time t27, and changes the drive signal M01 from the H-level to the L-level. Subsequently, the drive circuit 47A changes the drive signal M01 from the L-level to the H-level at time t28. Based on the output of the normal/reverse rotation determination circuit 45A and the drive circuit 47A, the motor drive control unit 40 sets the RDYB signal to be in the H-level in a period of times t25 to t28.

In the present embodiment, each period during which the M0FR signal is in the H-level (second level) is referred to as an instruction signal. In FIG. 3, each period of time t2 to time t3, time t7 to time t8, time t12 to time t13, time t14 to time t15, time t21 to time t22, and time t23 to time t24 is an instruction pulse. Therefore, in a period of time t1 to time t5 during which the GATE signal serving as a timing definition signal is in the H-level, the number of instruction pulses is one. In a period of time t11 to time t16 during which the GATE signal serving as a timing definition signal is in the H-level, the number of instruction pulses is two.

Although FIG. 3 illustrates an example of the M0FR signal, a relationship among the GATE signal, the M1FR signal, and the drive signals M10 and M11 is the same as above, and a relationship among the GATE signal, the M2FR signal, and the drive signals M20 and M21 is also the same as above.

In addition, in the example illustrated in FIG. 3, an example has been described in which normal rotation is performed when there is one instruction pulse of the instruction signal and reverse rotation is performed when there are two instruction pulses. However, the configuration is not limited thereto. An operation corresponding to the number of instruction pulses may be determined in advance by the main control circuit 204 and the motor drive control unit 40. In addition, the number of instruction pulses may be three or more. The operation corresponding to the number of instruction pulses may be stored in advance in the main control circuit 204 and the motor drive control unit 40.

In the example illustrated in FIG. 3, an example has been described in which the first motor 48A is controlled. However, the main control circuit 204 may control a plurality of motors 48 at the same time. In this case, for example, in a period during which the GATE signal is in the H-level, the main control circuit 204 changes the M0FR signal and the M1FR signal to each H-level and L-level of the M2FR signal. For example, the motor drive control unit 40 to which the instruction signal is input may control the first motor 48A to perform normal rotation, the second motor 48B to perform reverse rotation, and the third motor 48C to perform normal rotation.

Figure 4:
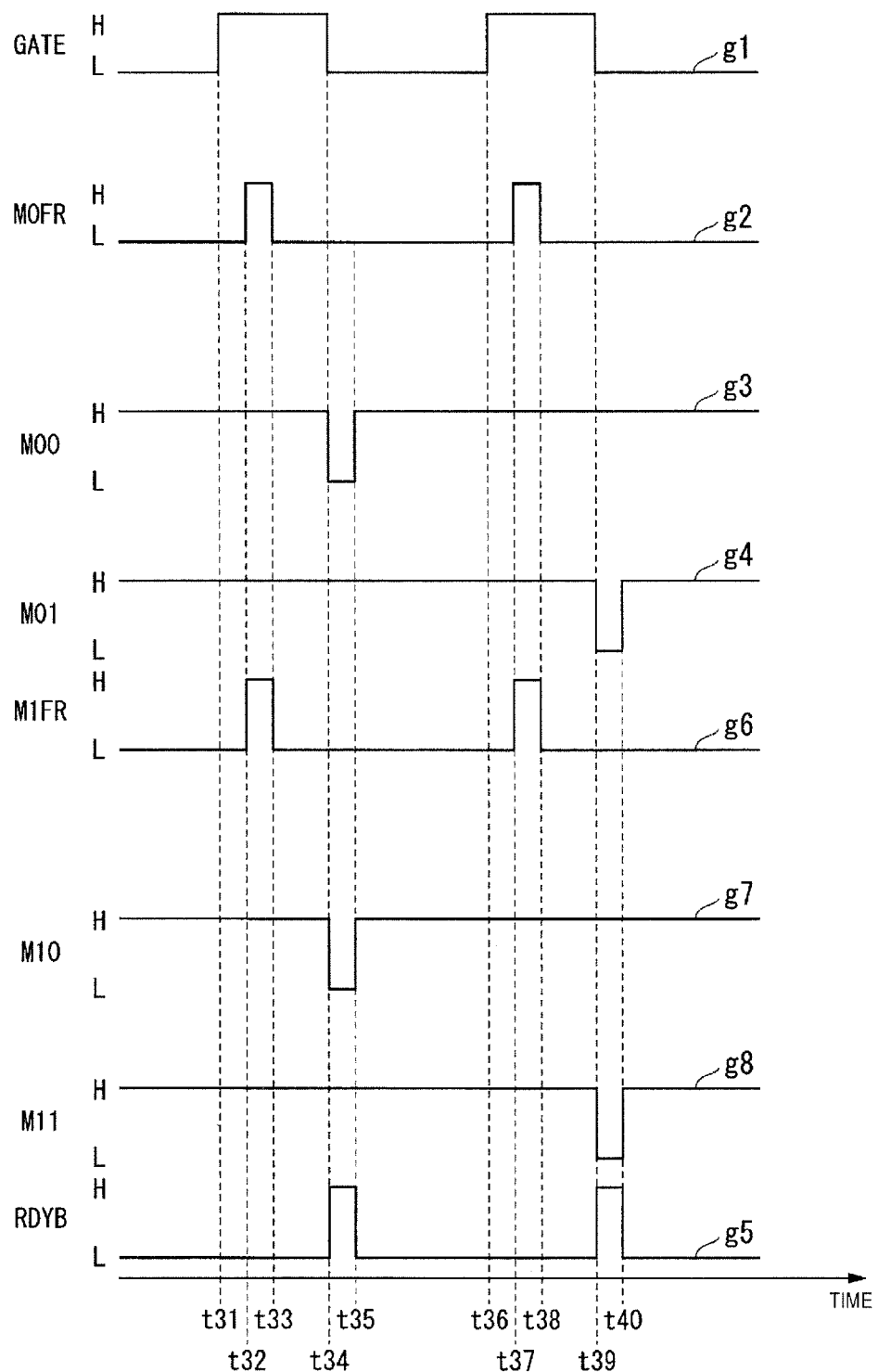
FIG. 4 is a view illustrating an example of timing of the GATE signal, instruction signals (M0FR and M1FR), the drive pulse, and the RDYB signal according to the first embodiment.

FIG. 4 is a view illustrating an example of the timing of the GATE signal, the instruction signals (M0FR and M1FR), the drive pulse, and the RDYB signal according to the present embodiment. In FIG. 4, the horizontal axis represents the time, and the vertical axis represents whether each signal is in the H-level or in the L-level. The waveforms g1 to g5 are the same as those in FIG. 3. A waveform g6 is a signal waveform of the M1FR signal, a waveform g7 is a signal waveform of the drive signal M10, and a waveform g8 is a signal waveform of the drive signal M11.

The main control circuit 204 changes the GATE signal from the L-level to the H-level at time t31. Subsequently, the main control circuit 204 changes each of the M0FR signal and the M1FR signal from the L-level to the H-level at time t32, and changes the M0FR signal and the M1FR signal from H-level to the L-level at time t33. Subsequently, the main control circuit 204 changes the GATE signal from the H-level to the L-level at time t34.

Since in the period during which the GATE signal is in the H-level, the number of periods during which the M0FR signal is in the H-level is one, the normal/reverse rotation determination circuit 45A determines that the signal indicates the instruction for normal rotation of the motor 48. Subsequently, the drive circuit 47A changes the drive signal M00 from the H-level to the L-level at time t34, and changes the drive signal M00 from the L-level to the H-level at time t35.

Since in the period during which the GATE signal is in the H-level, the number of periods during which the M1FR signal is in the H-level is one, the normal/reverse rotation determination circuit 45B determines that the signal indicates the instruction for normal rotation of the motor 48. Subsequently, the drive circuit 47B changes the drive signal M10 from the H-level to the L-level at time t34, and changes the drive signal M10 from the L-level to the H-level at time t35.

Based on the output of the normal/reverse rotation determination circuit 45A, the normal/reverse rotation determination circuit 45B, the drive circuit 47A, and the drive circuit 47B, the motor drive control unit 40 sets the RDYB signal to be in the H-level in a period of times t34 to t35.

Similarly to the period of times t31 to t34, in a period of times t36 to t39, the main control circuit 204 controls the GATE signal, the M0FR signal, and the M1FR signal.

The drive circuit 47A changes the drive signal M01 from the H-level to the L-level at time t39, and changes the drive signal M01 from the L-level to the H-level at time t40.

The drive circuit 47B changes the drive signal M11 from the H-level to the L-level at time t39, and changes the drive signal M11 from the L-level to the H-level at time t40.

Based on the output of the normal/reverse rotation determination circuit 45A, the normal/reverse rotation determination circuit 45B, the drive circuit 47A, and the drive circuit 47B, the motor drive control unit 40 sets the RDYB signal to be in the H-level in a period of times t39 to t40.

<Description of Operation Period of Main Control Circuit 204>

Next, an operation period of the main control circuit 204 will be described.

Figure 5:
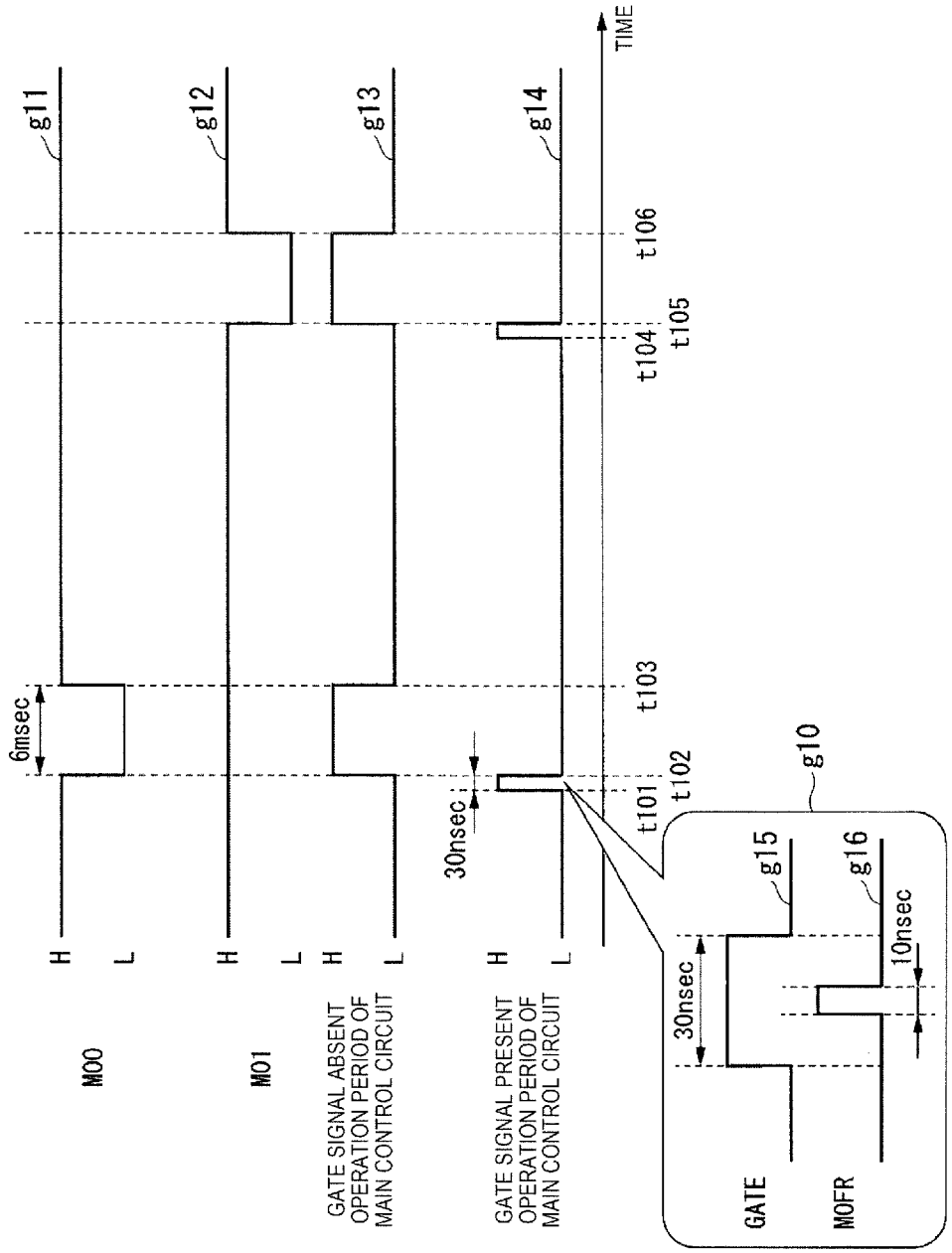
FIG. 5 is a view for describing an operation period of a main control circuit according to the first embodiment.

FIG. 5 is a view for describing the operation period of the main control circuit 204 according to the present embodiment. In FIG. 5, the horizontal axis represents the time, and the vertical axis represents whether each signal is in the H-level or in the L-level. In addition, a waveform g11 indicates the drive signal M00, a waveform g12 indicates the drive signal M01, and a waveform g13 indicates an operation period of a main control circuit according to a comparative example which does not employ the GATE signal. A waveform g14 indicates the operation period of the main control circuit 204 according to the present embodiment which employs the GATE signal. The example illustrated in FIG. 5 shows an example in a case where the motor 48 is caused to perform normal rotation.

A region enclosed by g10 is an example of the waveform of the GATE signal and the M0FR signal in a period of times t101 to t102 of the waveform g14. As described with reference to FIG. 3, the period of the M0FR signal in a case where the motor 48 is caused to perform normal rotation is 10 [ns], and the period of the GATE signal is 30 [ns]. This time shows a case where the oscillation frequency of the crystal oscillator 201 is 100 [MHz].

In the present embodiment, the main control circuit 204 is operated in the period during which the GATE signal is in the H-level, that is, in 30 [ns].

In a case where the motor 48 is driven without employing the GATE signal, the main control circuit needs to be continuously operated in a period of times t102 to t103 during which the drive pulse is supplied to the motor 48. The period of times t102 to t103 for the normal rotation of the motor 48 is 6 [ms], for example.

As described above, according to the present embodiment, compared to the comparative example without employing the GATE signal, the operation period of the main control circuit 204 while the motor is driven for normal rotation can be reduced to approximately 1/200 (=6 [ms]/30 [ns]). In this manner, according to the present embodiment, compared to the comparative example without employing the GATE signal, power consumption of the main control circuit 204 while the motor is driven for normal rotation can be reduced to 1/200.

Next, a process procedure when the main control circuit 204 outputs the instruction signal will be described.

Figure 6:
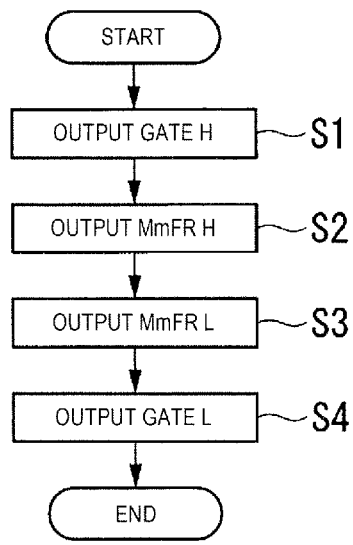
FIG. 6 is a flowchart of a process when the main control circuit according to the first embodiment outputs the instruction signal.

FIG. 6 is a flowchart of a process when the main control circuit 204 according to the present embodiment outputs the instruction signal. For example, the main control circuit 204 performs the following process at every one clock of 10 [ns] by using 100 [MHz].

(Step S1) The main control circuit 204 sets the GATE signal to be output to the GATE control line to be in the H-level.

(Step S2) The main control circuit 204 sets the MmFR signal to be output to the MmFR signal line (m is an integer of 0, 1, and 2) to be in the H-level.

(Step S3) The main control circuit 204 sets the MmFR signal output to the MmFR signal line (m is an integer of 0, 1, and 2) to be in the L-level.

(Step S4) The main control circuit 204 sets the GATE signal to be output to the GATE control line to be in the L-level.

Through the above-described steps, the process for outputting the instruction signal of the main control circuit 204 is completed.

Next, a process procedure of the motor drive control unit 40 when the instruction signal is input will be described.

Figure 7:
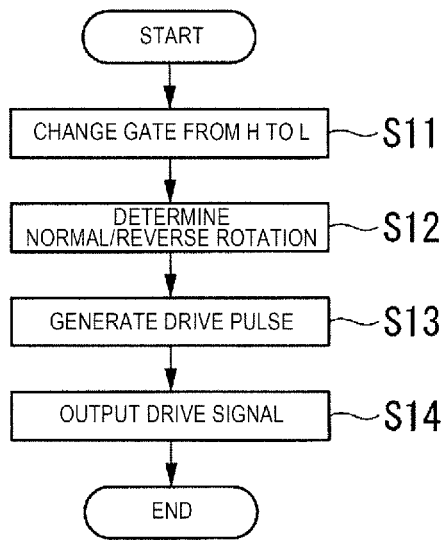
FIG. 7 is a flowchart of a process of a motor drive control unit when the instruction signal according to the first embodiment is input.

FIG. 7 is a flowchart of a process of the motor drive control unit 40 when the instruction signal according to the present embodiment is input. The motor drive control unit 40 performs the following process, based on a clock of 32 [kHz], for example.

(Step S11) The input control circuit 42 detects a period during which the GATE signal to be input to the GATE control line is in the H-level. Subsequently, the input control circuit 42 detects that the GATE signal is changed from the H-level to the L-level.

(Step S12) The normal/reverse rotation determination circuit 45 counts the number of instruction pulses in the H-level of the MmFR signal in a period during which the GATE signal is in the H-level. Based on the number of counted instruction pulses, the normal/reverse rotation determination circuit 45 determines whether the instruction is a normal rotation instruction or a reverse rotation instruction.

(Step S13) Based on the determination result output by the normal/reverse rotation determination circuit 45, the drive pulse generation unit 46 generates a pulse signal for causing the motor 48 to perform normal rotation one step or reverse rotation one step.

(Step S14) Based on the pulse signal output by the drive pulse generation circuit 46, the drive circuit 47 generates a drive signal for driving the motor 48, and drives the motor 48 by using the generated drive signal.

Through the above-described steps, the process of the motor drive control unit 40 when the instruction signal is input is completed.

Herein, an example of a process procedure of the main control circuit without employing the GATE signal according to a comparative example will be described.

Figure 8:
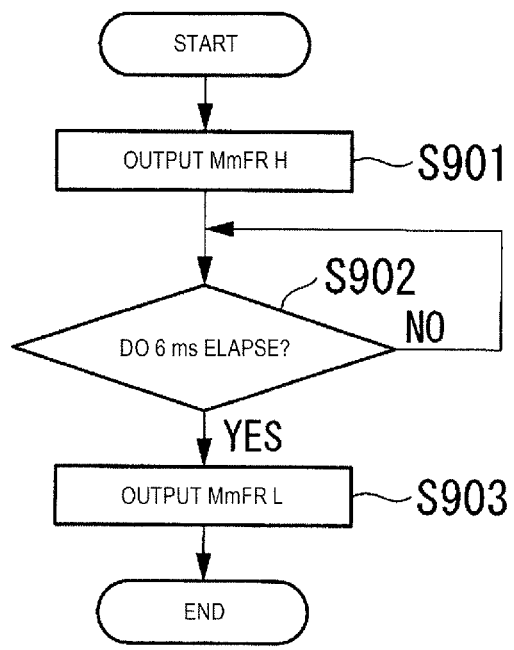
FIG. 8 is a flowchart of a process of a main control circuit which does not use the GATE signal according to a comparative example.

FIG. 8 is a flow chart of the process of the main control circuit without employing the GATE signal according to the comparative example. Similarly to FIG. 6, the main control circuit performs the following process at every one clock of 10 [ns] by using 100 [MHz], for example.

(Step S901) The main control circuit sets the MmFR signal to be output to the MmFR signal line to be in the H-level. Subsequently, the main control circuit starts a counter.

(Step S902) The main control circuit determines whether or not 6 [ms] elapse, based on a measured value of the counter. In a case where the main control circuit determines that 6 [ms] do not elapse (Step S902; NO), the process in Step S902 is repeated. In a case where the main control circuit determines that 6 [ms] elapse (Step S902; YES), the process proceeds to Step S903.

(Step S903) The main control circuit sets the MmFR signal to be output to the MmFR signal line to be in the L-level.

Through the above-described steps, the process for outputting the instruction signal of the main control circuit is completed.

As described with reference to FIG. 8, according to the comparative example, the main control circuit is continuously operated for 6 [ms] during which the motor 48 is driven, thereby consuming power.

On the other hand, in the present embodiment, the main control circuit 204 is operated only for the period of 40 [ns] during which the GATE signal is in the H-level. Accordingly, compared to the comparative example, power consumption can be reduced.

As described above, in the present embodiment, the number of H-levels of the MmFR (m is an integer of 0, 1, or 2) in the period during which the GATE signal is in the H-level is counted. In this manner, the drive pulse is generated by determining whether the instruction is the normal rotation instruction or the reverse rotation instruction. As a result, according to the present embodiment, in a case of three motors 48 to be driven, the main control circuit 204 and the motor drive control unit 40 can be connected to each other by two control lines and three signal lines, the number of which is the same as the number of motors 48. The RDYB signal indicates the period during which the motor drive control unit 40 drives the motor 48 and the instruction is not received. Therefore, after the GATE signal and the MmFR signal are output from the main control circuit 204 side, the instruction may not be transmitted for a predetermined time required for driving the motor 48. In this case, in a case of three motors 48, the main control circuit 204 and the motor drive control unit 40 may be connected to each other by one control line and three signal lines excluding the RDYB control line.

As described above, in the present embodiment, one motor 48 is provided with one signal line (M0FR, M1FR, or M2FR) controlling each motor 48, and is further provided with the control line of the GATE signal. Therefore, the number of inputs to the motor drive control unit 40 included in the electronic device 1 according to the present embodiment is obtained by adding one to the number of motors.

In addition, the instruction signal (any one of the M0FR signal, the M1FR signal, and the M2FR signal) for instructing the timing to drive the motor 48 (any one of the first motor 48A to the third motor 48C) according to the present embodiment has one instruction pulse in the period during which the GATE signal is continuously in the H-level at the time of normal rotation, and has two instruction pulses at the time of reverse rotation.

Furthermore, according to the present embodiment, compared to a case without employing the GATE signal, the operation period of the main control circuit 204 during normal rotation of the motor can be reduced to approximately 1/200 (=6 [ms]/30 [ns]). As a result, according to the present embodiment, compared to the case without employing the GATE signal, power consumption of the main control circuit 204 when the motor is driven to perform normal rotation can be reduced to 1/200.

Second Embodiment

In the first embodiment, an example has been described in which the electronic device 1 includes the charging terminal 11, the charging control circuit 12, and the secondary battery 13. However, in the present embodiment, an example will be described in which an electronic device 1A includes a solar cell and a secondary battery. In the present embodiment, the H-level is referred to as a first level, and the L-level is referred to as a second level.

Figure 9:
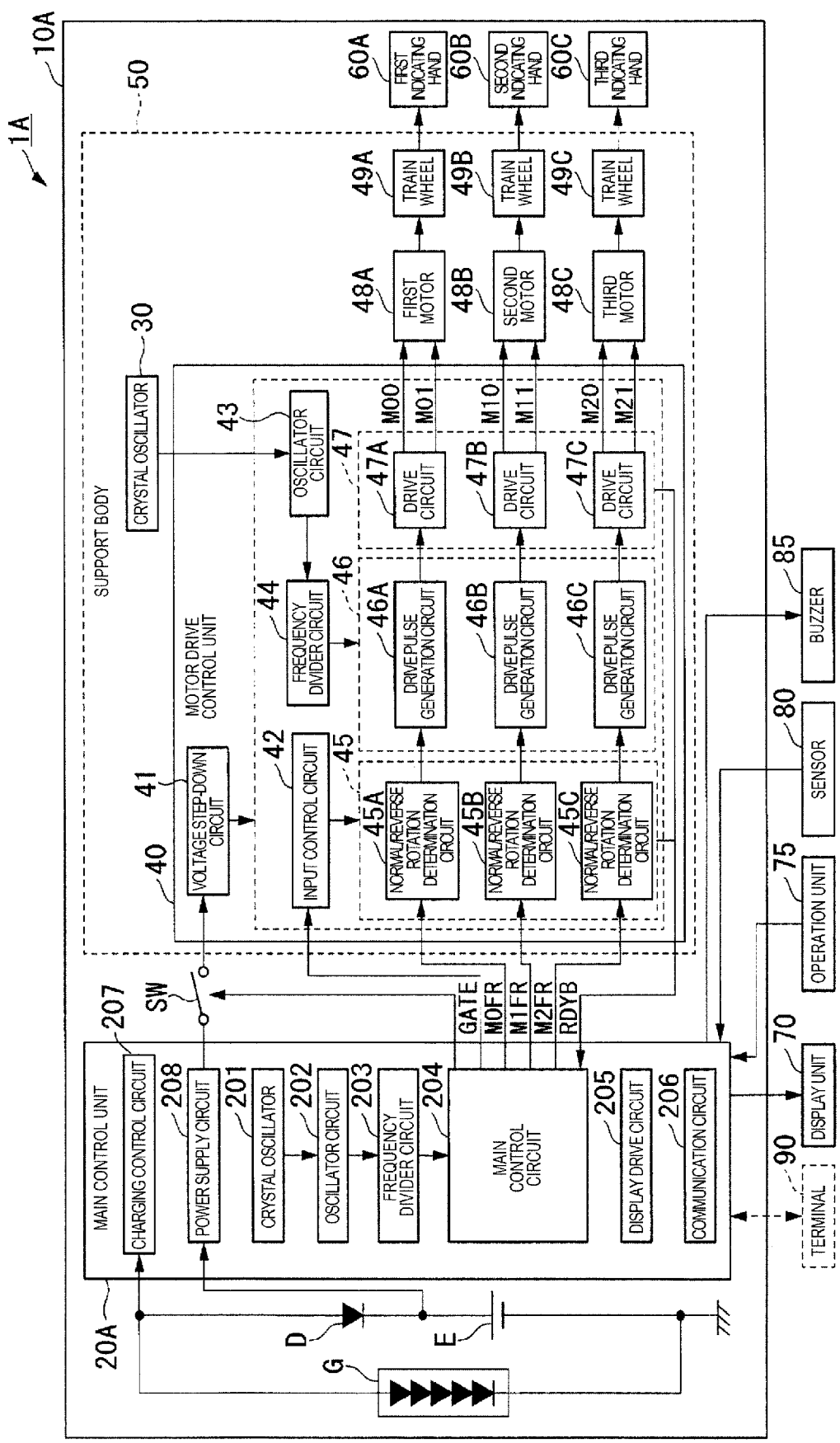
FIG. 9 is a block diagram illustrating a configuration example of an electronic device according to a second embodiment.

FIG. 9 is a block diagram illustrating a configuration example of the electronic device 1A according to the present embodiment. The same reference numerals will be used for configuration elements having the same functions as those of the electronic device 1 (FIG. 1) described in the first embodiment.

As illustrated in FIG. 9, the electronic device 1A includes a solar cell G, a diode D, a secondary battery E, a switch SW, a main control unit 20A, the support body 50, the first indicating hand 60A, the second indicating hand 60B, the third indicating hand 60C, the display unit 70, the operation unit 75, the sensor 80, and the buzzer 85. The solar cell G, the diode D, the secondary battery E, the main control unit 20A, and the support body 50 are attached to a circuit board 10A.

The main control unit 20A includes the crystal oscillator 201, the oscillator circuit 202, the frequency divider circuit 203, the main control circuit 204, the display drive circuit 205, the communication circuit 206, the charging control circuit 207, and the power supply circuit 208.

For example, the solar cell G is a solar panel. The solar cell G converts light energy into power, and supplies the converted power to the secondary battery E and the main control unit 20A.

The diode D is inserted between the solar cell G and the secondary battery E in order to prevent reverse flowing from the secondary battery E to the solar cell G.

The secondary battery E is a storage battery for storing electric energy supplied from the solar cell G. The secondary battery E supplies the stored power to the main control unit 20A.

The charging control circuit 207 controls the secondary battery E charged with the power generated by the solar cell G. The charging control circuit 207 detects a charging voltage of the secondary battery E. In a case where the charging voltage of the secondary battery E is detected and the detected charging voltage is equal to or greater than a predetermined threshold value, the charging control circuit 207 performs control so that a current does not flow from the solar cell G to the secondary battery E, thereby preventing the overcharge.

For example, the power supply circuit 208 is configured to include a voltage step-down circuit, an oscillation constant voltage circuit, a logic constant voltage circuit, and a power supply boosting circuit. The voltage step-down circuit steps down the voltage of the power generated by the solar cell G and the power stored in the secondary battery E to a desired voltage value, and supplies the power having the stepped down voltage value to the oscillation constant voltage circuit, the logic constant voltage circuit, and the power supply boosting circuit. The oscillation constant voltage circuit uses the power supplied from the voltage step-down circuit so as to generate a constant voltage to be supplied to the oscillator circuit 202, and supplies the generated constant voltage to the oscillator circuit 202. The logic constant voltage circuit generates a constant voltage to be supplied to a logic unit by using the power supplied from the voltage step-down circuit, and supplies the generated constant voltage to the logic unit. The logic unit includes at least the main control circuit 204. The power supply boosting circuit boosts the power supplied from the voltage step-down circuit to a desired voltage value, and supplies the power having the boosted voltage value to the display drive circuit 205.

The main control unit 20A may include a power generation amount detection circuit for detecting a power generation amount of the solar cell G, a luminance detection circuit for detecting the luminance of the environment in which the electronic device 1 is used, and a battery residual quantity detection circuit for detecting the battery residual quantity of the secondary battery E. Each detection circuit may output the detection value to the main control circuit 204.

As illustrated in FIG. 9, in the electronic device 1A, the main control circuit 204 and the motor drive control unit 40 are also connected to each other by two control lines and three signal lines. Therefore, the electronic device 1A according to the present embodiment can also obtain an advantageous effect the same as that according to the first embodiment.

As described above, in the related art, a motor driver is included in the main control unit. However, in the configuration according to the above-described embodiments, the motor drive control unit 40 is separated from the main control circuit 204. In this manner, according to the above-described embodiments, a process load is reduced in the main control circuit 204, thereby improving self-controllability on the motor drive control unit 40 side.

In addition, according to the above-described embodiments, the signal line for transmitting the control signal from the main control circuit 204 to the motor drive control unit 40 employs a single line. In this manner, it is possible to minimize the number of signal lines allocated to motor control in the main control circuit 204.

For example, even in a case where five terminals are allocated for controlling the communication circuit 206, additionally the number of operation buttons increases, and the number of allocated control terminals increases, according to the above-described embodiments, the control line to the motor drive control unit 40 can be ensured. Therefore, the motor 48 can be reliably driven and controlled.

Furthermore, according to the above-described embodiments, even when a plurality of the support bodies 50 including one motor 48 and one motor drive control units 40 are mounted on the electronic device 1, the number of terminals of the main control circuit 204 which are allocated to one motor 48 is minimized. Therefore, it is possible to ensure the control of the plurality of motors 48.

According to the above-described embodiments, the operation time of the main control circuit 204 when the indicating hand is driven is most shortened. Accordingly, the power of the main control circuit 204 can be saved.

In addition, according to the above-described embodiments, a configuration is adopted in which the RDYB signal indicating a hand operating state is output. Accordingly, until the main control circuit 204 outputs the subsequent instruction signal (hand operation control signal), the timepiece waits for edge interrupt. Therefore, the power of the main control circuit 204 can also be saved during high speed hand operation.

In addition, according to the above-described embodiments, the motor drive control unit 40 is operated, for example, with current consumption of approximately 0.1 μA during a period other than the hand operation time, thereby minimizing a contribution ratio to the power consumption of the entire system.

In addition, according to the above-described embodiments, the input period of the instruction signal is defined by the GATE signal, and the input period is minimized. Accordingly, an erroneous operation against external noise can be prevented.

In addition, according to the above-described embodiments, the motor drive control unit 40 is operated by stepping down the power supply voltage of the motor drive control unit 40 to the same voltage (1.57 V, for example) as that of the indicating hand electronic timepiece in the related art. Accordingly, even if the power supply voltage of the whole system is 3 V to 4.2 V as in a lithium ion battery, the specification of the motor 48 can achieve power saving or can achieve optimized high torques.

In addition, according to the above-described embodiments, the hand positions are managed by the main control circuit 204. Accordingly, a hand position counter inside the motor drive control unit 40 is not needed, and thus, the circuit scale can be minimized.

In the above-described embodiments, an example has been described in which power is consumed when the main control circuit 204 outputs the H-level. However, the configuration is not limited thereto. The power consumption may correspond to a logic circuit of the main control circuit 204 to be used. In a case of high power consumption when the L-level is output, for example, the main control circuit 204 may switch the GATE signal from the H-level to the L-level at time t3 in FIG. 3, may switch the M0FR signal from the H-level to the L-level at time t2, may switch the M0FR signal from the L-level to the H-level at time t3, and may switch the GATE signal from the L-level to the H-level at the time t4. In this case, the first level is the L-level, and the second level is the H-level.

Third Embodiment

In the first embodiment and the second embodiment, an example has been described in which the main control circuit 204 outputs two types of instruction (instruction to cause the motor 48 to perform normal rotation, instruction to cause the motor 48 to perform reverse rotation) to the motor drive control unit 40. However, the configuration is not limited thereto. The number of instruction types may be three or more.

In a third embodiment, an example will be described in which the number of instruction types is four.

Figure 10:
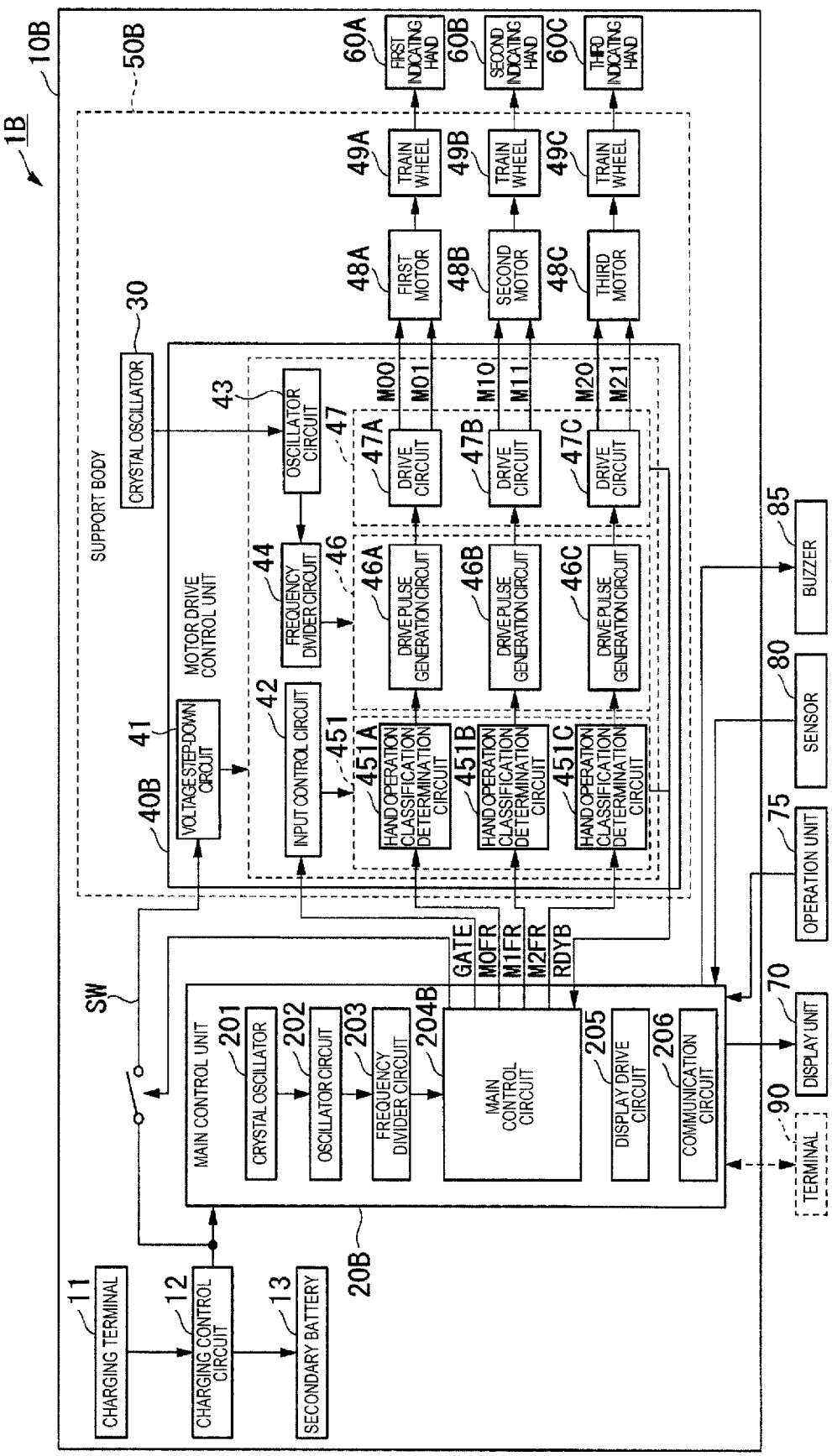
FIG. 10 is a block diagram illustrating a configuration example of an electronic device according to a third embodiment.

FIG. 10 is a block diagram illustrating a configuration example of an electronic device 1B according to the present embodiment.

As illustrated in FIG. 10, the electronic device 1B includes the charging terminal 11, the charging control circuit 12, the secondary battery 13, the switch SW, a main control unit 20B, a support body 50B, the first indicating hand 60A, the second indicating hand 60B, the third indicating hand 60C, the display unit 70, the operation unit 75, the sensor 80, and the buzzer 85. The same reference numerals will be used for configuration elements having the same functions as those of the electronic device 1 (FIG. 1) described in the first embodiment. In addition, in FIG. 10, an example will be described in which the present embodiment is applied to the electronic device 1. However, it is also possible to apply the present embodiment to the configuration of the electronic device 1A (FIG. 9).

The main control unit 20B includes the crystal oscillator 201, the oscillator circuit 202, the frequency divider circuit 203, a main control circuit 204B, the display drive circuit 205, and the communication circuit 206.

The crystal oscillator 30, the motor drive control unit 40B, the first motor 48A, the second motor 48B, the third motor 48C, the train wheel 49A, the train wheel 49B, and the train wheel 49C are attached to the support body 50B.

The motor drive control unit 40B includes the voltage step-down circuit 41, the input control circuit 42, the oscillator circuit 43, the frequency divider circuit 44, a hand operation classification determination circuit 451 (determination circuit), the drive pulse generation circuit 46, and the drive circuit 47. The hand operation classification determination circuit 451 includes a hand operation classification determination circuit 451A (determination circuit), a hand operation classification determination circuit 451B (determination circuit), and a hand operation classification determination circuit 451C (determination circuit).

In this way, a difference between the electronic device 1 and the electronic device 1B is present in the main control circuit 204B and the hand operation classification determination circuit 451.

In addition to the process of the main control circuit 204, the main control circuit 204B outputs an instruction to operate the indicating hand 60 using a third type (hereinafter, referred to as a third type hand operation), and an instruction to operate the indicating hand 60 using a fourth type (hereinafter, referred to as a fourth type hand operation) to the motor drive control unit 40B. In the present embodiment, an operation for causing the indicating hand 60 to perform normal rotation via the motor 48 is referred to as a first operation, an operation for causing the indicating hand 60 to perform reverse rotation via the motor 48 is referred to as a second operation, an operation for causing the indicating hand 60 to be operated using the third type via the motor 48 is referred to as a third operation, and an operation for causing the indicating hand 60 to be operated using the fourth type via the motor 48 is referred to as a fourth operation.

The hand operation classification determination circuit 451 determines a type of the instruction signal output by the main control circuit 204B. The hand operation classification determination circuit 451 outputs the determination result to the drive pulse generation circuit 46.

The M0FR signal serving as the first instruction signal is input to the hand operation classification determination circuit 451A. The hand operation classification determination circuit 451A counts the number of periods during which the input control circuit 42 outputs the signal indicating the H-level and the number of periods during which the M0FR signal is in the H-level, thereby identifying hand operation classification of the M0FR signal. The hand operation classification determination circuit 451A outputs the determination result to the drive pulse generation circuit 46A, when the GATE signal is changed from the H-level to the L-level. The determination result indicates any one of information or a signal indicating normal rotation, information or a signal indicating reverse rotation, information or a signal indicating a low voltage hand operation (also referred to as BLI (abbreviation of a battery life indicator) hand operation), and information or a signal indicating a demonstration hand operation. Here, the low-voltage hand operation (BLI hand operation) is a hand operation of the indicating hand in a state where the voltage value of the secondary battery 13 is equal to or smaller than a predetermined voltage. For example, the low-voltage hand operation means a state where the indicating hand is operated two steps once every 2 seconds. In addition, the demonstration hand operation means a hand operation state used for confirmation of the operation or demonstration when the timepiece is shipped or displayed at stores. For example, the demonstration hand operation means a hand operation state where each indicating hand 60 performs normal rotation to reverse rotation or performs reverse rotation to normal rotation.

The M1FR signal serving as the second instruction signal is input to the hand operation classification determination circuit 451B. The hand operation classification determination circuit 451B counts the number of periods during which the input control circuit 42 outputs the signal indicating the H-level, and the number of periods during which the M1FR signal is in the H-level, thereby identifying the hand operation classification of the M1FR signal. When the GATE signal is changed from the H-level to the L-level, the hand operation classification determination circuit 451B outputs the determination result to the drive pulse generation circuit 46B.

The M2FR signal serving as the third instruction signal is input to the hand operation classification determination circuit 451 C. The hand operation classification determination circuit 451C counts the number of periods during which the input control circuit 42 outputs a signal indicating the H-level, and the number of periods during which the M2FR signal is in the H-level, thereby identifying the hand operation classification of the M2FR signal. When the GATE signal is changed from the H-level to the L-level, the hand operation classification determination circuit 451C outputs the determination result to the drive pulse generation circuit 46C.

Next, an example of each instruction signal of the first type hand operation to the fourth type hand operation will be described.

Figure 11:
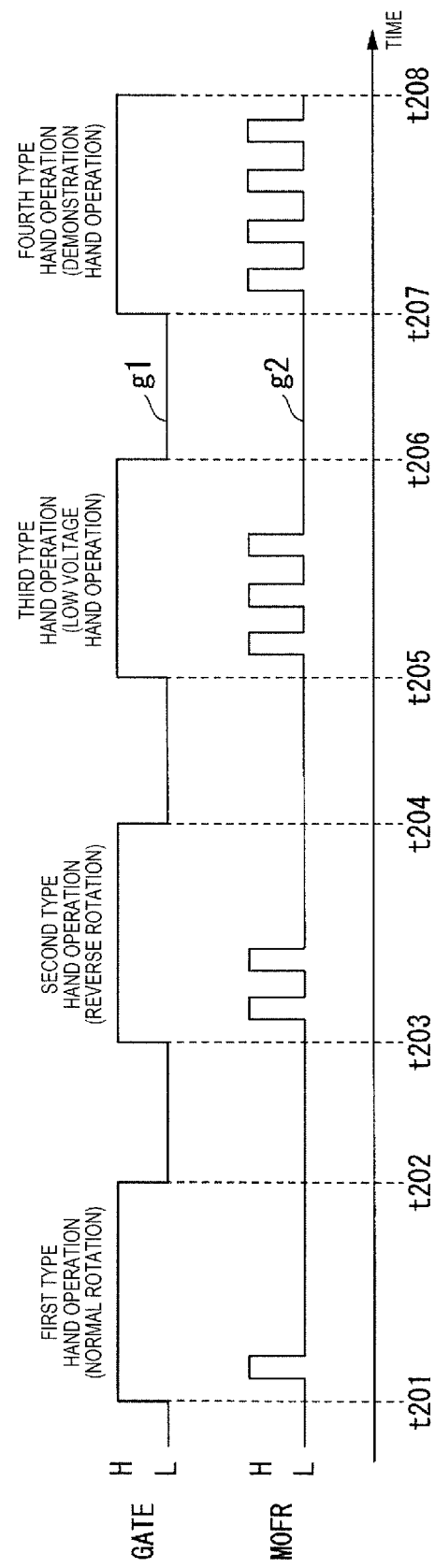
FIG. 11 is a view illustrating an example of each instruction signal of a first type hand operation to a fourth type hand operation according to the third embodiment.

FIG. 11 is a view illustrating an example of each instruction signal of the first type hand operation to the fourth type hand operation according to the present embodiment. In FIG. 11, as an example of the instruction signal, description will be made using the M0FR signal. In FIG. 11, the horizontal axis represents the time, and the vertical axis represents whether each signal is in the H-level or in the L-level. In addition, the waveform g1 is a signal waveform of the GATE signal, and the waveform g2 is a signal waveform of the M0FR signal.

In the example illustrated in FIG. 11, a period of time t201 to time t202 has one instruction pulse of the instruction signal, and represents a period of the first type hand operation which causes the indicating hand 60 to perform the normal rotation hand operation.

A period of time t203 to time t204 has two instruction pulses of the instruction signal, and represents a period of the second type hand operation which causes the indicating hand 60 to perform the reverse rotation hand operation.

A period of time t205 to time t206 has three instruction pulses of the instruction signal, and represents a period of the third type hand operation which causes the indicating hand 60 to perform the low voltage hand operation.

A period of time t207 to time t208 has four instruction pulses of the instruction signal, and represents a period of the fourth type hand operation which causes the indicating hand 60 to perform the demonstration hand operation.

Next, each signal example in the third type hand operation (low voltage hand operation) will be described.

Figure 12:
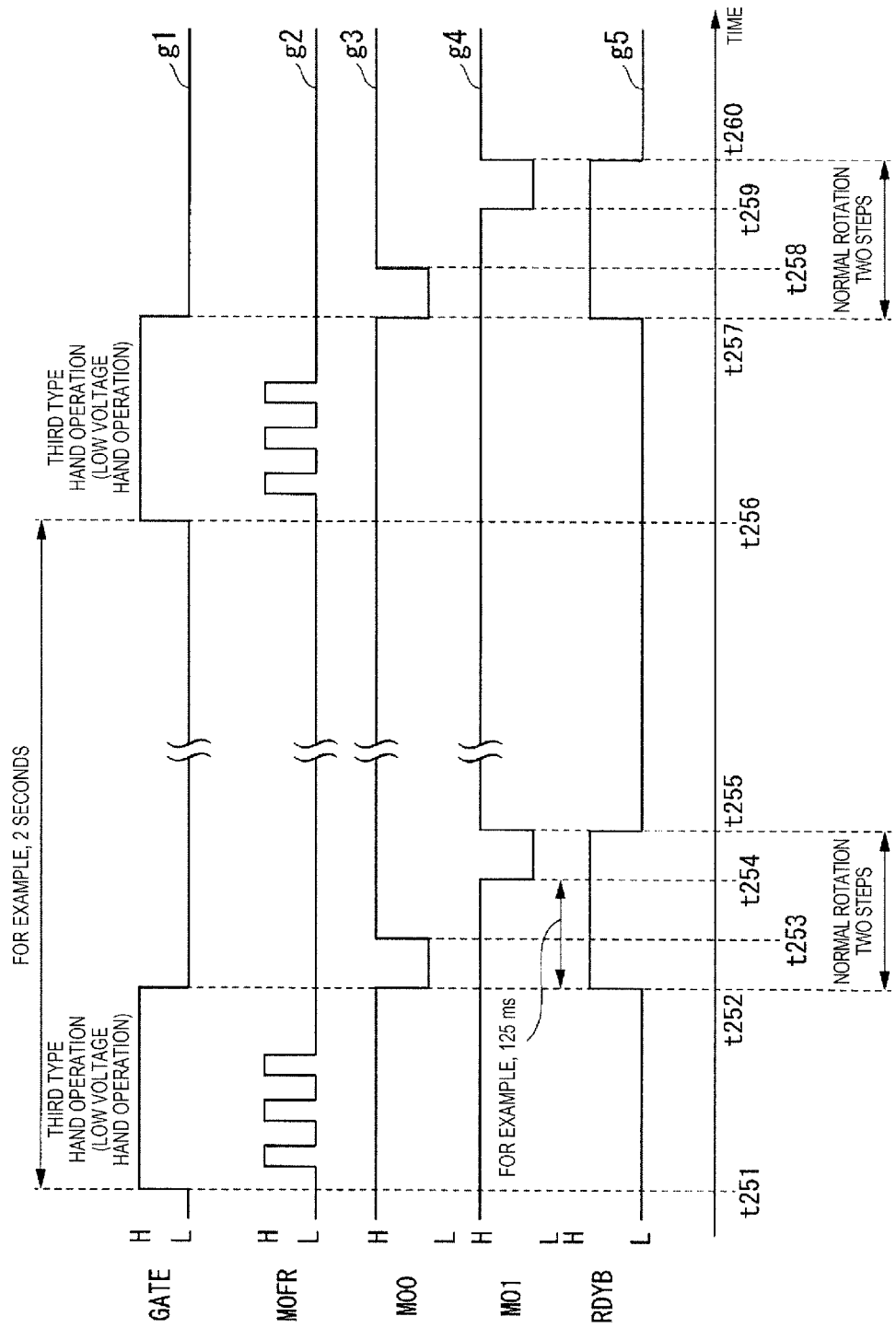
FIG. 12 is a view illustrating each signal example in the third type hand operation according to the third embodiment.

FIG. 12 is a view illustrating each signal example in the third type hand operation according to the present embodiment. In FIG. 12, the horizontal axis represents the time, and the vertical axis represents whether each signal is in the H-level or in the L-level. The waveforms g1 to g5 are the same as those in FIG. 3. In addition, in FIG. 12, the M0FR signal indicates an example of the instruction signal.

The main control circuit 204B changes the GATE signal from the L-level to the H-level in a period of time t251 to time t252. Subsequently, the main control circuit 204B outputs three instruction pulses in which the M0FR signal is in the H-level in the period of time t251 to time t252.

Since in the period during which the GATE signal is in the H-level, the number of periods during which the M0FR signal is in the H-level is three (three instruction pulses), the hand operation classification determination circuit 451A determines the instruction for the low voltage hand operation. Subsequently, the drive circuit 47A changes the drive signal M00 from the H-level to the L-level at time t252, and changes the drive signal M00 from the L-level to the H-level at time t253. Based on the output of the hand operation classification determination circuit 451A and the drive circuit 47A, the motor drive control unit 40B sets the RDYB signal to be in the H-level at time t252. Subsequently, the drive circuit 47A changes the drive signal M01 from the H-level to the L-level at time t254, and changes the drive signal M01 from the L-level to the H-level at time t255. Based on the output of the hand operation classification determination circuit 451A and the drive circuit 47A, the motor drive control unit 40B sets the RDYB signal to be in the L-level at time t255. In this manner, the first indicating hand 60A performs normal rotation for two steps.

An operation in a period time t256 to time t260 is similar to an operation of a period of time t251 to time t255. A period of time t251 and time t256 is 2 seconds, for example. A period of time t252 and time t254 is 125 ms, for example.

Next, each signal example in the fourth hand operation classification will be described.

Figure 13:
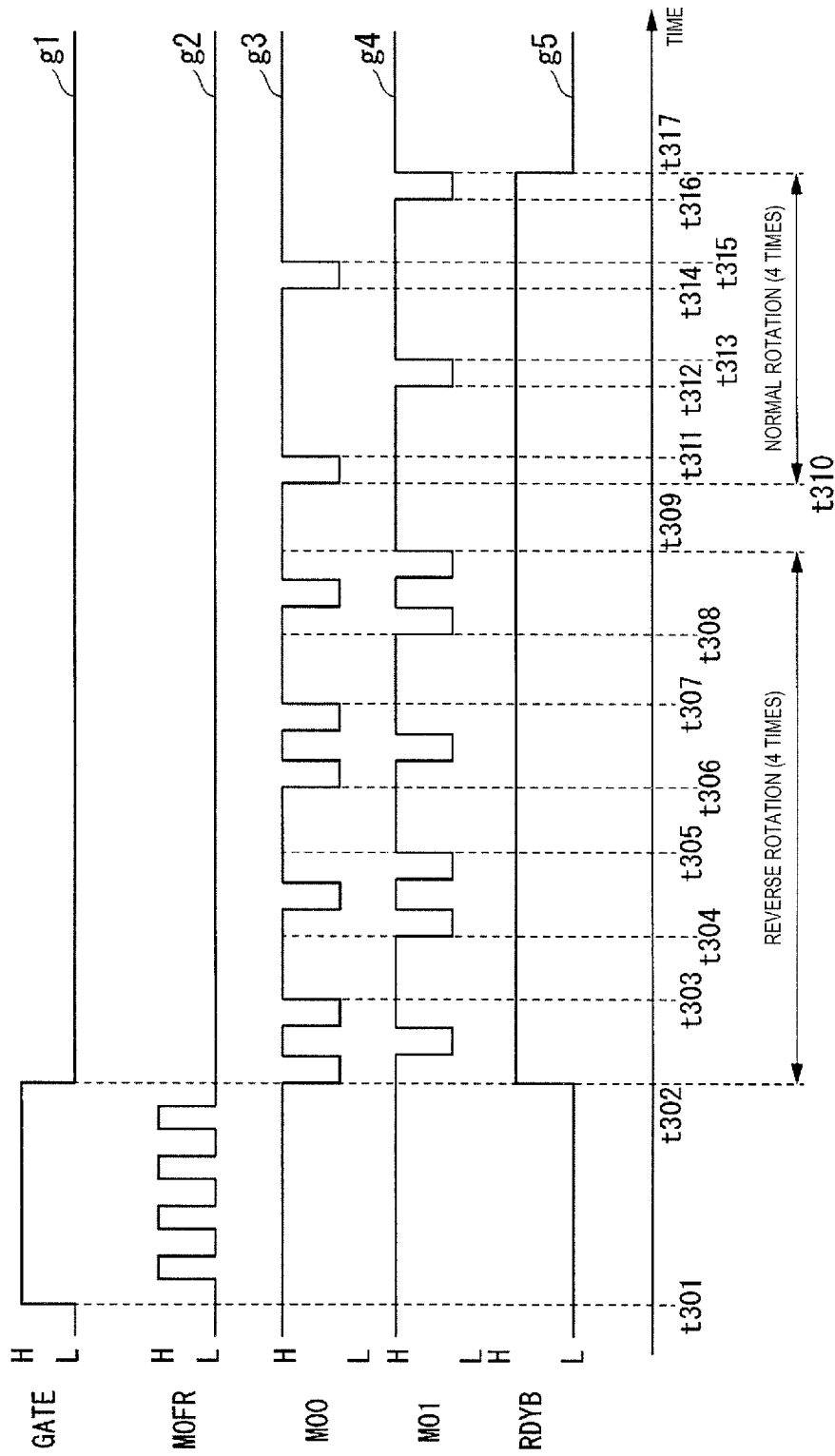
FIG. 13 is a view illustrating each signal example in the fourth type hand operation according to the third embodiment.

FIG. 13 is a view illustrating each signal example in the fourth type hand operation according to the present embodiment. In FIG. 13, the horizontal axis represents the time, and the vertical axis represents whether each signal is in the H-level or in the L-level. The waveforms g1 to g5 are the same as those in FIG. 12. In addition, FIG. 13 illustrates an example in which the M0FR signal is the instruction signal. In the example illustrated in FIG. 13, as the demonstration hand operation, normal rotation is performed four times after reverse rotation is performed four times.

The main control circuit 204B changes the GATE signal from the L-level to the H-level in a period of time t301 to time t302. Subsequently, the main control circuit 204B outputs four instruction pulses in which the M0FR signal is in the H-level in the period of time t301 to time t302.

Since in the period during which the GATE signal is in the H-level, the number of periods during which the M0FR signal is in the H-level is four (four instruction pulses), the hand operation classification determination circuit 451A determines the instruction for demonstration hand operation. Subsequently, the drive circuit 47A outputs the drive signal M00 and the drive signal M01 so that the first indicating hand 60A performs reverse rotation four times in a period of time t302 to time t309. Subsequently, the drive circuit 47A outputs the drive signal M00 and the drive signal M01 so that the first indicating hand 60A performs normal rotation four times in a period of time t310 to time t317. Based on the output of the hand operation classification determination circuit 451A and the drive circuit 47A, the motor drive control unit 40B sets the RDYB signal to be in the H-level in a period of time t302 to t317.

Next, a process procedure of the motor drive control unit 40B when the instruction signal is input will be described.

Figure 14:
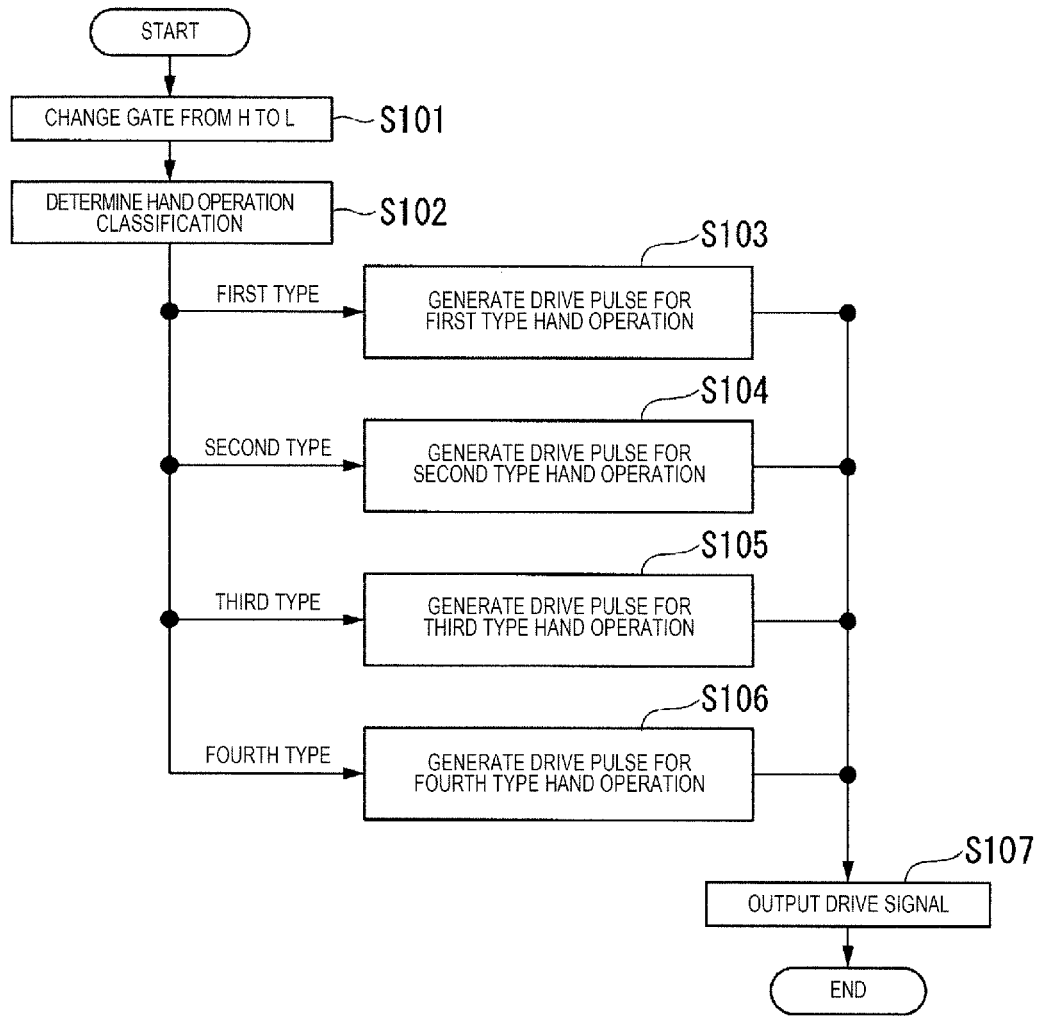
FIG. 14 is a flowchart of a process of a motor drive control unit when an instruction signal according to the third embodiment is input.

FIG. 14 is a flowchart of a process of the motor drive control unit 40B when the instruction signal according to the present embodiment is input.

(Step S101) The input control circuit 42 detects a period during which the GATE signal input to the GATE control line is in the H-level. Subsequently, the input control circuit 42 detects that the GATE signal is changed from the H-level to the L-level.

(Step S102) The hand operation classification determination circuit 451 counts the number of instruction pulses in which the MmFR signal is in the H-level in a period during which the GATE signal is in the H-level, and determines a type of the instruction signal, based on the number of counted instruction pulses. In a case where the hand operation classification determination circuit 451 determines the first type hand operation, the process proceeds to Step S103. In a case where the hand operation classification determination circuit 451 determines the second type hand operation, the process proceeds to Step S104. In a case where the hand operation classification determination circuit 451 determines the third type hand operation, the process proceeds to Step S105. In a case where the hand operation classification determination circuit 451 determines the fourth type hand operation, the process proceeds to Step S106.

(Step S103) Based on the determination result output by the hand operation classification determination circuit 451, the drive pulse generation unit 46 generates the pulse signal for causing the motor to perform normal rotation one step (first type hand operation). After the process is performed by the drive pulse generation unit 46, the process proceeds to Step S107.

(Step S104) Based on the determination result output by the hand operation classification determination circuit 451, the drive pulse generation unit 46 generates the pulse signal for causing the motor to perform reverse rotation one step (second type hand operation). After the process is performed by the drive pulse generation unit 46, the process proceeds to Step S107.

(Step S105) Based on the determination result output by the hand operation classification determination circuit 451, the drive pulse generation unit 46 generates the pulse signal for causing the motor to perform the low voltage hand operation (third type hand operation). After the process is performed by the drive pulse generation unit 46, the process proceeds to Step S107.

(Step S106) Based on the determination result output by the hand operation classification determination circuit 451, the drive pulse generation unit 46 generates the pulse signal for causing the motor to perform the demonstration hand operation (fourth type hand operation). After the process is performed by the drive pulse generation unit 46, the process proceeds to Step S107.

(Step S107) Based on the pulse signal output by the drive pulse generation circuit 46, the drive circuit 47 generates the drive signal for driving the motor 48, and drives the motor by using the generated drive signal.

Through the above-described steps, the process of the motor drive control unit 40B when the instruction signal is input is completed.

As described above, in the present embodiment, the number of instruction pulses included in the instruction signal is counted, and based on the counting result, two or more types of hand operation classification for causing the indicating hand 60 to perform hand operations via the motor 48 are determined.

According to the present embodiment, in addition to the advantageous effect of the first embodiment and the second embodiment, this configuration enables the indicating hand to perform different hand operations in response to the number of instruction pulses included in the instruction signal.

In the above-described embodiments, for example, the load other than the indicating hand is the display drive circuit 205 and the communication circuit 206. However, the configuration is not limited thereto. Any other load may be applicable as long as the load other than the indicating hand can be loaded on the timepiece and requires high speed processing in the control unit.

The present invention is not limited to the above-described embodiments. In addition, in the present invention, any two or more preferred embodiments among the first embodiment, the second embodiment, and the third embodiment can be partially or entirely combined with each other.

A program for entirely or partially realizing the functions of the main control unit 20 (20A or 20B) or the motor drive control unit 40 (40B) according to the present invention may be recorded in a computer-readable recording medium. The program recorded in the recording medium may be read and executed by a computer system so as to entirely or partially fulfill the functions of the main control unit 20 (20A or 20B) or the motor drive control unit 40. The "computer system" described herein includes OS or hardware of peripheral devices. In addition, the "computer system" also includes a WWW system provided with a homepage providing environment (or display environment). The "computer-readable recording medium" means a portable medium such as a flexible disk, a magneto-optical disk, a ROM, and a CD-ROM, or a storage medium such as a hard disk incorporated in the computer system. Furthermore, the "computer-readable recording medium" includes those which hold the program for a certain period of time, such as a volatile memory (RAM) inside the computer system serving as a server or a client in a case where the program is transmitted via a network such as the Internet or a communication line such as a telephone line.

In addition, the above-described program may be transmitted from the computer system having the program stored in the storage device to another computer system via a transmission medium or by using a transmission wave in the transmission medium. Herein, the "transmission medium" for transmitting the program means a medium having a function to transmit information as in a network (communication network) such as the Internet or a communication line (communication cable) such as a telephone line. Furthermore, the above-described program may partially realize the above-described functions. In addition, the above-described program may be a so-called difference file (difference program) which can realize the above-described functions in combination with the program previously recorded in the computer system.

What is claimed is:

1. A timepiece that comprises a plurality of motors each configured to operate an indicating hand of the timepiece, the timepiece comprising:
   at least one oscillation circuit configured to output a first clock signal at a first frequency and a second clock signal at a second frequency that is set lower than the first frequency;
   a main control circuit configured to operate at the first frequency to generate a separate instruction signal to each of the plurality motors, the instruction signal being operable to set an operation mode of a corresponding motor, and the operation mode being set to determine a rotational direction of the corresponding motor; and
   a motor control circuit provided separately from the main control circuit and configured to operate at the second frequency to receive the instruction signal from the main control circuit, the motor control circuit comprising a plurality of motor drive circuits arranged, respectively, for the plurality of motors, each of the plurality of motor drive circuits configured to operate at the second frequency to generate, in response to the instruction signal from the main control circuit, drive pulses that drive a corresponding motor according to the instruction signal.

2. The timepiece according to claim 1, wherein the first clock signal and the second clock signal are asynchronous with each other.

3. The timepiece according to claim 1, wherein the main control circuit is configured to generate the instruction signal at a timing determined by the first frequency,
   wherein the main control circuit is configured to generate an enabling signal having a time duration during which the instruction signal is outputted from the main control circuit, the main control circuit configured to generate the enabling signal at the timing determined by the first frequency, and
   wherein each of the plurality of motor drive circuits is configured to generate the drive pulses at timing determined by the second frequency.

4. The timepiece according to claim 3, wherein the instruction signal includes one or more instruction pulses,
   wherein each of the plurality of motor drive circuits includes a determination circuit configured to count a number of the one or more instruction pulses during the time duration of the enabling signal and determine an operation mode of a corresponding motor, the operation mode corresponding to the number of the one or more instruction pulses counted during the time duration of the enabling signal, and
   wherein each of the plurality of motor drive circuits is configured to generate the drive pulses to drive the corresponding motor accordingly to the determined operation mode.

5. The timepiece according to claim 4, wherein the number of the one or more instruction pulses counted during the time duration of the enabling signal determines one of the operation modes.

6. The timepiece according to claim 4, wherein the operation modes include at least one of a first type of indicating hand operation to perform a first operation, a second type of indicating hand operation to perform a second operation different from the first operation, a third type of indicating hand operation to perform a third operation different from the first operation and the second operation, or a fourth type of indicating hand operation to perform a fourth operation different from the first operation, the second operation, and the third operation.

7. The timepiece according to claim 6, wherein the first type of indicating hand operation is to operate the indicating hand to perform a normal rotation, the first type of indicating hand operation is performed when there is only one instruction pulse found during the time duration of the enabling signal,
   wherein the second type of indicating hand operation is to operate the indicating hand to perform a reverse rotation, the second type of indicating hand operation is performed when there are two indicating pulses found during the time duration of the enabling signal,
   wherein the third type of indicating hand operation is to operate the indicating hand to notify a user of a lowered battery voltage, the third type of indicating hand operation is performed when there are three instruction pulses found during the time duration of the enabling signal, and
   wherein the fourth type of indicating hand operation is to operate the indicating hand to perform an operation different from operations of the indicating hand operations that are performed when a time is displayed, the fourth type of indicating hand operation is performed when there are four instruction pulses found during the time duration of the enabling signal.

8. The timepiece according to claim 3, wherein the time duration of the enabling signal is defined between a first timing at which the main control circuit brings the enabling signal to a first level and a second timing at which the main control circuit brings the enabling signal, which is set at the first level, to a second level, and the main control circuit is configured to generate the instruction pulses during the defined time duration of the enabling signal.

9. The timepiece according to claim 3, wherein the plurality of motor drive circuits include a first motor drive circuit configured to drive a first motor for driving a first indicating hand, and a second motor drive circuit configured to drive a second motor for driving a second indicating hand, and
   wherein the main control circuit is configured to provide the instruction signal to each of the first and second motor drive circuits during the time duration of a same enabling signal.

10. The timepiece according to claim 1, wherein the indicating hand indicates a point of time measured by hours and minutes.

11. The timepiece according to claim 3, further comprising signal lines for providing the instruction signal from the main control circuit to the motor control circuits, the signal lines provided at a number equal to a number of the plurality of motors, wherein the enabling signal is provided from the main control circuit to the motor control circuit through an additional signal line separate from the signal lines.

12. A control method of a timepiece that comprises a plurality of motors each configured to operate an indicating hand, the method comprising:
   operating at least one oscillation circuit to output a first clock signal at a first frequency and a second clock signal at a second frequency that is set lower than the first frequency;
   operating a main control circuit at the first frequency to generate an instruction signal to each of the plurality of motors, the instruction signal including an operation mode of a corresponding motor, and the operation mode determining a rotation direction of the corresponding motor; and operating a motor control circuit at the second frequency to receive the instruction signal from the main control circuit, the motor control circuit provided separately from the main control circuit comprising a plurality of motor drive circuits arranged, respectively, for the plurality of motors, wherein operating a motor control circuit at the second frequency comprises operation each of the plurality of motor drive circuits at the second frequency to generate, in response to the instruction signal, drive pulses that drive a corresponding motor accordingly to the instruction signal, wherein operating a main control circuit at the first frequency comprises generating an enabling signal having a time duration to the motor control circuit, and operating a main control circuit at the first frequency further comprises generating the instruction signal during the time duration of the enabling signal.

13. The control method of a timepiece according to claim 12, wherein the instruction signal includes one or more instruction pulses, operating a main control circuit comprises generating the one or more instruction pulses to one motor drive circuit, and operating a motor control circuit comprises operating said one motor drive circuit to count a number of the one or more instruction pulses and determining an operation mode, the operation mode corresponding to the number of the one or more instruction pulses.

* * * * *